United States Patent
Shaaban et al.

(10) Patent No.: US 10,752,821 B2
(45) Date of Patent: *Aug. 25, 2020

(54) DRY COOLING SYSTEMS USING THERMALLY INDUCED POLYMERIZATION

(71) Applicant: Applied Research Associates, Inc., Albuquerque, NM (US)

(72) Inventors: Aly H. Shaaban, Panama City, FL (US); Gong Zhou, Panama City, FL (US); Joshua J Mormile, Panama City, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/422,124

(22) Filed: May 24, 2019

(65) Prior Publication Data

US 2019/0352551 A1    Nov. 21, 2019

Related U.S. Application Data

(63) Continuation-in-part of application No. 16/119,771, filed on Aug. 31, 2018, now Pat. No. 10,487,694,
(Continued)

(51) Int. Cl.
   *C09K 5/16* (2006.01)
   *F01K 17/02* (2006.01)
   (Continued)

(52) U.S. Cl.
   CPC ............ *C09K 5/16* (2013.01); *F01K 7/16* (2013.01); *F01K 9/003* (2013.01); *F01K 17/02* (2013.01);
   (Continued)

(58) Field of Classification Search
   CPC ... C09K 5/16; F01K 17/02; F01K 7/16; F01K 9/003; F01K 3/004; F25B 23/00;
   (Continued)

(56) References Cited

U.S. PATENT DOCUMENTS

| 5,584,193 A | 12/1996 | Biermann |
| 2010/0300093 A1 | 12/2010 | Doty |

(Continued)

FOREIGN PATENT DOCUMENTS

| WO | 2012101110 A1 | 8/2012 |

OTHER PUBLICATIONS

International Search Report and Written opinion relating to International Patent Application No. PCT/US2016/065259 dated Mar. 27, 2017.

(Continued)

*Primary Examiner* — Michael C Miggins
(74) *Attorney, Agent, or Firm* — Dinsmore & Shohl, LLP; Monika L'Orsa Jaensson, Esq.

(57) ABSTRACT

A dry-cooling system useful in absorbing heat from a heat source and related dry cooling methods including a depolymerization cooling unit (DCU) in fluid communication with a polymerization heating unit (PHU). The DCU includes a DCU heat exchanger which receives a polymer and a catalyst, wherein contact of the polymer and the catalyst within the DCU heat exchanger causes an endothermic reaction, converting the polymer to a monomer and drawing heat from a first heat source. The monomer is then withdrawn from the DCU. The PHU includes a PHU heat exchanger, which receives the monomer, wherein contact of the monomer with the catalyst causes an exothermic reaction within the PHU heat exchanger, converting the monomer to the polymer. The polymer is then withdrawn from the PHU for conveyance back to the DCU, and the cycle is repeated.

21 Claims, 20 Drawing Sheets

Related U.S. Application Data which is a continuation-in-part of application No. 15/896,147, filed on Feb. 14, 2018, now Pat. No. 10,066,142, which is a continuation-in-part of application No. 15/642,388, filed on Jul. 6, 2017, now Pat. No. 9,920,658, which is a continuation-in-part of application No. 15/370,355, filed on Dec. 6, 2016, now Pat. No. 9,702,596.

(60) Provisional application No. 62/264,392, filed on Dec. 8, 2015.

(51) Int. Cl.
| | | |
|---|---|---|
| *F01K 7/16* | (2006.01) | |
| *F01K 9/00* | (2006.01) | |
| *F25B 23/00* | (2006.01) | |
| *F25B 30/06* | (2006.01) | |
| *F28D 20/00* | (2006.01) | |
| *F28B 9/06* | (2006.01) | |
| *F01K 3/00* | (2006.01) | |
| *F25B 13/00* | (2006.01) | |
| *F25B 5/04* | (2006.01) | |

(52) U.S. Cl.
CPC .............. *F25B 23/00* (2013.01); *F25B 30/06* (2013.01); *F28B 9/06* (2013.01); *F28D 20/003* (2013.01); *F01K 3/004* (2013.01); *F25B 5/04* (2013.01); *F25B 13/00* (2013.01); *F25B 2313/02732* (2013.01); *F28D 2020/006* (2013.01)

(58) Field of Classification Search
CPC ................................ F25B 30/06; F25B 13/00; F25B 2313/02732; F25B 5/04; F28D 20/003; F28D 2020/006; F28B 9/06
See application file for complete search history.

(56) References Cited

U.S. PATENT DOCUMENTS

| | | |
|---|---|---|
| 2013/0224078 A1 | 8/2013 | Van Grambezen et al. |
| 2013/0306268 A1 | 11/2013 | Ducheyne et al. |
| 2015/0338172 A1 | 11/2015 | Fiorotto et al. |

OTHER PUBLICATIONS

International Search Report and Written opinion relating to International Patent Application No. PCT/US2016/040830 dated Sep. 19, 2017.

Bell et al. "Kinetics of the Depolymerisation of Kinetics of Depolymersation of Paraldeyde in Aqueous Soltion", J. Chem. Soc., pp. 774-778, 1954.

Flueckiger et al., "Thermodynamic and Kinetic Investigation of a Chemical Reaction-Based Minature Heat Pump", Energy Conversion and Management 64, pp. 222-231, 2012.

Kawasaki et al., "Proposal of a Chemical Heat Pump with Paraldehyde Depolymerization for Cooling System", Applied Thermal Engineering 19, pp. 133-143, 1999.

Kawaski et al., "Characteristics of Chemical Heat Pump through Kinetic Analysis of Paraldehyde Depolymerization", Journal of Chemical Engineering of Japan, vol. 31, No. 33, pp. 374-380, 1998.

Singh et al., "Ambient Air Temperature Effect on Power Plan Performance", International Journal of Engineering Science and Technology, vol. 4, No. 8, pp. 3916-3923, Aug. 2012.

Tanabe et al., "The Mechanism of Depolymerization of Paraldehyde Catalyzed by Solid Acid", J. Res. Inst. Cat. Hokkaido Univ. 8(1), pp. 43-50, 1960.

U.S. Enfironmental Protection Agency (EPA), Technical Development Document for the Final Regulations Addressing Cooling Water Intake Structures for New Facilities, Nov. 2001.

EPRI, "Comparison of Alternate Cooling Technologies for U.S. Power Plants: Economic, Environmental, and Ohter Tradeoffs", 2004.

FIGURE 1: (PRIOR ART)

DRY COOLING SYSTEMS USING THERMALLY INDUCED POLYMERIZATION

BACKGROUND OF THE INVENTION

The disclosed technology regards a cooling system which can function to provide power plant condensers with cooling water at desirable temperature levels to maintain turbine power production at optimum thermal efficiency levels. The technology may also replace the power plant condenser, and provide the power plant low-pressure-turbine with return water at temperatures to achieve the turbine's designed optimum back pressure at any ambient conditions. The disclosed technology further relates to an improvement in dry cooling systems to overcome the inherent thermodynamic performance penalty of air-cooled systems, particularly under high ambient temperatures. The disclosed technology has other applications, including providing cooling and heating in air conditioning systems, and generally in the removal of heat from liquid sources in a controlled environment, as well as streams or other water sources in the natural environment. Using the methods of the technology, heat generated by the system may also be used to warm an environment or another liquid source.

The disclosed technology further regards a cooling system which can be integrated with the thermal management system of directed energy systems such as high energy lasers (HELs). By means of a coolant, the thermal management system of an HEL absorbs heat generated by the pump diodes and other HEL components, and the disclosed technology is effective in withdrawing heat from the coolant, thereby facilitating continuous operation of the HEL.

More than 86% of electricity in the United States of America is produced by thermoelectric power generating plants, most of which use coal, natural gas, or nuclear fuel to generate thermal energy. As shown in FIG. 1, the thermal energy produces superheated steam in the boiler/steam generator, which drives a steam turbine to produce electrical power by the generator. Each power plant is designed for the conditions of its particular geographic location, which conditions impact the design point of the low pressure turbine exhaust pressure. The exhausted steam coming out of the turbine last stage is condensed in a condenser by cooling heat transfer with the condenser, then pumped back to the boiler as boiler return water, and the process is repeated. Although unique to each plant, the return condensate water ranges in temperature from 35° C. to 52° C.

The pressure of the outlet steam causing the turbine blade rotation, called back pressure, is defined by the condenser temperature. For dry cooling systems, the condenser temperature is a strong function of the ambient temperature. Therefore, an increase in ambient temperature directly affects the power plant efficiency. For indirect cooling systems, the ambient air increases the cooling water temperature which in turn increases the condenser temperature. However, for direct air cooled systems the condenser temperature is directly influenced by the ambient temperature.

Typically, more than 60% of the original energy generated by the steam generator/boiler is wasted and carried away as low-grade heat by the plant condenser cooling water or directly dissipated to the ambient air. Operators must remove this heat, and 99% of baseload thermoelectric plants in the United States of America use water-cooled systems, or wet cooling, to remove the heat from the condenser cooling water. Power plant operators prefer wet cooling over dry-cooling systems because ambient water temperatures tend to be cooler and more stable than ambient air temperatures; further, water evaporation allows for additional cooling capacity, enabling more cost-effective rejection of heat. However, the wet cooling processes lead to a significant amount of water loss, with power plants using wet-cooling systems currently accounting for 41% of all fresh water withdrawals in the United States of America.

Availability of fresh water resources is increasingly strained by drought and growing demands, and potential climate change impacts add uncertainty to the quality and quantity of future water supplies. However, while dry-cooling technologies do not result in significant water use, because of their sensitivity to ambient air temperatures current dry-cooling technologies drive down the overall efficiency of power generation compared with the efficiency of wet cooled condensers. Therefore, there is a need for a dry-cooling technology that eliminates water loss or the dependency on water while maintaining the high operating efficiencies of electric power generation presently achieved by wet-cooling technologies.

Power plant condenser cooling is divided into five main technology areas, which differ greatly in the amounts of water consumed: (1) once-through cooling; (2) closed-cycle wet cooling; (3) cooling ponds; (4) dry cooling; and (5) hybrid cooling.

Once-through cooling systems withdraw cold water from, and return heated water to, a natural body of water such as a lake, a river, or the ocean. In operation, the source water is pumped through the tubes of a steam condenser. As steam from the turbine condenses on the outside of the tubes, the heat of condensation is absorbed by the source water flowing through the tubes. The source water exiting the condenser, warmed by 15° F. to 30° F. depending on system design, is discharged to the original source. The amount withdrawn varies from 25,000 to 50,000 gallons/MWh. Although none of the water is consumed within the plant, some consumptive loss results from enhanced evaporation from the surface of the natural body of water due to the heated water discharge. The loss due to this enhanced evaporation is not well known and is expected to be site-specific, but it has been estimated as 0.5% to 2% of the withdrawn source water amount, or 125 to 1000 gallons/MWh. The biggest drawback of once-through cooling systems is that heated discharges may degrade the natural body of water, increasing the overall water temperature of the natural body of water. The thermal pollution is most significant when the source of the water is a river or other body with limited volume, where the water withdrawn and discharged is a significant portion of the natural water flow.

Wet cooling is similar to once-through cooling in that as cold source water flows through the tubes of a steam condenser, steam from the turbine condenses on the outside of the tubes. However, instead of returning the heated condenser water to its source, it is pumped to a wet cooling device such as a cooling tower, cooling pond, or cooling canal, where it is cooled by evaporation of a small portion of the water to the atmosphere to within 5° F. to 10° F. of the ambient wet-bulb temperature. Makeup water is added to compensate for the water loss due to evaporation and the again cooled water is then recirculated to the steam condenser.

Wet cooling devices used in closed-cycle wet cooling transfer thermal energy from heated cooling water to the atmosphere through both heat transfer to the ambient air and evaporation, to bring the cooling water to near wet-bulb air temperature. Specifically, as ambient air is drawn past a flow of cooling water, a small portion of the water evaporates, and the energy required to evaporate that portion of the water is taken from the remaining mass of water, thus reducing its temperature. About 970 Btu of thermal energy is absorbed for each pound of water evaporated.

To achieve better performance, heated cooling water may be sprayed to a medium, called fill, to increase the surface area and the time of contact between the air and water flow. Some systems use splash fill, which is material placed to interrupt the water flow causing splashing. Other systems use film fill, which includes thin sheets of material (usually PVC) upon which the water flows, enhancing evaporation.

Cooling towers draw air either by natural draft or mechanical draft, or both. Natural draft cooling towers utilize the buoyancy of warm air, and a tall chimney structure. In this structure the warm, moist air naturally rises due to the density differential compared to the dry, cooler outside air, producing an upward current of air through the tower. Hyperbolic towers have become the design standard for natural draft cooling towers due to their structural strength and minimum usage of material. The hyperbolic shape also aids in accelerating air flow through the tower, and thus increases cooling efficiency. Mechanical draft towers use motor-driven fans to force or draw air through the towers, and include induced draft towers which employ a fan at the top of the tower that pulls air up through the tower (as shown in FIG. 1), and forced draft towers which use a blower-type of fan at the bottom of the tower, which forces air into the tower.

Cooling ponds are man-made bodies of water which supply cooling water to power plants, and are used as an effective alternative to cooling towers or once-through cooling systems when sufficient land, but no suitable natural body of water, is available. The ponds receive thermal energy from the heated condenser water, and dissipate the thermal energy mainly through evaporation. The ponds must be of sufficient size to provide continuous cooling, and makeup water is periodically added to the pond system to replace the water lost through evaporation.

Current dry cooling systems can be a direct system, in which turbine exhaust steam is condensed in an air-cooled condenser (ACC), or an indirect system, in which the steam is condensed in a conventional water-cooled condenser. For indirect systems, the heated cooling water is circulated through an air-cooled heat exchanger before returning to the water-cooled condenser. In the direct system, the steam is condensed in the ACC in finned tube bundles (galvanized steel tubes with aluminum fins), and the heat is dissipated directly to the ambient air. Direct and indirect cooling systems operate without water loss (other than a small amount of water used to periodically clean the air-side surfaces of the air-cooled condenser or heat exchanger). The condensing temperature, in the case of direct dry cooling, or the cold water temperature, in the case of indirect dry cooling, is limited by the ambient air temperature, which is always higher than the ambient dry-bulb temperature. Although dry cooling achieves significant water savings, the capital and operating costs are much higher than they are for closed-cycle wet cooling, and the physical footprint is larger. Furthermore, plant performance is reduced in the hotter times of the year when the steam-condensing temperature (and hence the turbine exhaust pressure) is substantially higher (being limited by ambient air temperature) than it would be with wet cooling.

Another dry cooling system is the Heller System, which uses a direct contact condenser instead of a steam surface condenser. In this system the turbine exhaust steam is in direct contact with a cold water spray, and no condenser tubes are used. The resulting hot condensate and water mixture are pumped to an external air-cooled heat exchanger. The air-cooled heat exchanger may have a mechanical draft design, a natural draft design or a fan-assisted natural draft design. The direct contact condenser has the advantage of lower terminal temperature difference (TTD, which is the temperature difference between the saturation steam temperature and the cooling water outlet temperature), and thus lowers turbine back-pressure.

Hybrid cooling systems have both dry and wet cooling elements that are used alternatively or together to achieve the best features of each system. In a hybrid cooling system a power plant can achieve the wet cooling performance on the hottest days of the year, and the water conservation capability of dry cooling at other times. The wet and dry cooling components can be arranged in series, or in parallel, and may be separate structures or integrated into a single tower. The dry cooling system elements can be either direct or indirect types. The most common configuration for hybrid cooling systems to date has been parallel, separate structures with direct dry cooling.

Like the wet cooling systems described hereinabove, the wet cooling elements of a hybrid system use significant amounts of water, particularly during the summer months. Therefore, it is most suitable for sites that have significant water availability but not enough for all-wet cooling at all times of the year. For sites where water use is highly limited or contentious, even the use of 20% of the all-wet amounts might be unacceptable, requiring all-dry cooling to allow the plant to be permitted. For sites with adequate water, the performance and economic advantages of all-wet cooling systems are significant. In some cases, plant siting might be eased by evidence of "responsible citizenship," in which by means of a hybrid cooling system a plant developer offers some degree of reduced water use to the local community concerned about water for agriculture, recreation, or industry.

The disclosed technology overcomes the aforementioned problems associated with power plant condenser cooling. A broad object of the disclosed technology is to provide a novel method and apparatus for removal of waste heat from power plant condensers with high overall process thermal efficiency and without water waste.

Another object of the disclosed technology is to provide for power plant cooling in a relatively compact apparatus, by maximizing the thermal capacities of the apparatus. A further object of the disclosed technology is to provide a dry cooling system and method of dry cooling for effective heat removal or heat generation, operating at a high coefficient of performance.

In another field of innovation, the thermal management system (TMS) for directed energy systems such as high energy lasers (HELs) absorbs heat generated by the pump diodes and other HEL components and rejects it to the environment, thereby preventing the HEL from overheating and enabling it to operate continuously. Because HELs generate a significant amount of heat, TMSs capable of providing a sufficient level of cooling to dissipate this heat continuously are very large, heavy, and consume a significant amount of electricity. For example, a 100 kW HEL with 20% electro-optical efficiency would require a TMS that provides 400 kW of cooling. Thus, even if the cooling system is efficient, for example having a coefficient of performance of 4, then 100 kW of electricity would be required just to operate the TMS. This significant power consumption competes with the available electricity required to operate the HEL. Therefore, there is a need for a TMS that allows continuous HEL operation, but also has a very low Size, Weight, and Power (SWaP). The disclosed technology and methods provides an effective thermal management system for directed energy systems such as HELs, allowing for continuous operation of the HEL, while maintaining a low SWaP.

SUMMARY OF THE INVENTION

In accordance with the above objects, the disclosed technology relates to cooling systems and methods which function to provide power plant condensers with return water at the necessary temperature levels to maintain power production at their optimum thermal efficiency levels. Optimum condenser temperature varies depending on the power plant's design and its geographic location. Condenser temperature design for combined cycle and steam power plants ranges between 35-52° C. As hereinabove discussed, the condenser's ability to lower supply water/condensate temperature determines the back pressure for the low-pressure steam turbine, wherein an increase in condenser temperature increases the back pressure on the turbine blades, leading to reduced power plant efficiency.

The disclosed technology may also replace the power plant condenser, or be used to improve other cooling systems. The disclosed technology further may be used in other applications, such as providing cooling and heating in air conditioning systems, and generally in the removal of heat from waste/stream heat sources.

The disclosed technology is specifically useful in a power plant's dry cooling system, using the depolymerization of a polymer over a catalyst in a closed system, including in liquid communication a plurality of heat exchangers configured to form depolymerization and polymerization assemblies. In some embodiments a cold energy storage assembly is also provided.

The depolymerization process and assembly of the disclosed technology depolymerizes a polymer over a catalyst, resulting in a monomer rich vapor or a polymer-monomer liquid (as described in the embodiments below). This depolymerization process is an endothermic reaction, drawing heat from the source water (e.g., condenser water or steam exiting the low pressure turbine, last stage) flowing through the heat exchanger in a depolymerization cooling unit (DCU).

The monomer rich vapor or the polymer-monomer liquid is then transferred to the polymer separation unit (PSU), where the monomer rich vapor is separated from the polymer-monomer liquid. The monomer rich vapor is conveyed to the polymerization assembly, reacting over an acid catalyst bed in a polymer heating unit (PHU) to convert the monomer back to the original polymer in liquid phase. The polymerization process is an exothermic reaction, and heat generated may be expelled from the heat exchanger vessel of the polymerization assembly by, for example, air cooled or liquid cooled processes. In some embodiments, the polymerization assembly employs the dry cooling approach to expel heat from the PHU, using air cooled heat exchangers. In other embodiments, the heat generated from the polymerization process of the disclosed technology is transferred to and used by another subprocess of the technology. To complete the cycle, the polymer stream is pumped by a liquid pump back to the DCU to provide below ambient wet bulb temperature cooling for a standalone cooling system.

To achieve continuous operation with high conversion efficiencies, the system may include one or more polymer separation units (PSU), whereby using heat from an independent stream of source liquid, ambient air or heat generated from the polymerization process, the monomer vapor rich mixture (or polymer-monomer liquid) from the DCU and/or the polymer rich liquid mixture from the PHU are further separated into two streams: a vaporous light monomer rich stream and a liquid polymer rich stream. The PSU(s) thereby creates a buffer between the DCU and the PHU. In some embodiments a single PSU is placed downstream of the DCU and downstream from the PHU, enhancing polymer/monomer separation from each assembly. In another embodiment, a first PSU can be placed downstream of the DCU, enhancing polymer-monomer separation from the DCU product vapor stream, and a second PSU is placed downstream of the PHU, enhancing polymer-monomer separation from the PHU product liquid stream. In a third embodiment, the PSU and PHU are configured so that heat generated from the PHU is transferred to the PSU, such as in a combined polymerization and separation unit as hereinafter described. In these and similar configurations, the light monomer-rich stream from the PSU(s) is circulated into the PHU for further polymerization reaction, while the polymer-rich liquid stream from the PSU(s) is circulated directly to the DCU for depolymerization, or collected in a holding tank for later circulation through the DCU.

To provide cooling below ambient wet bulb temperatures during hot summer days with temperatures higher than the saturation temperature at steam turbine back pressure, the elevated temperature polymer produced in the PHU may be stored in a cold energy storage assembly, having a day storage tank (DST) which stores the elevated temperature polymer from the PHU (or the PSU). In the evening, the elevated temperature polymer cycles through a polymer cooling heat exchanger unit (PCU), dissipating its sensible heat into the cooler evening ambient air. The lower temperature polymer may then be stored in a cold energy storage tank (CST), where it waits for reuse the next day by pumping the liquid polymer to the DCU, and the cycle is repeated.

In some embodiments, water is incorporated into the depolymerization/polymerization cycle of the disclosed technology, partially vaporizing in the DCU with the depolymerization of the polymer, and condensing in the PHU with the polymerization of the monomer.

In similar and other embodiments, the disclosed technology uses a liquid catalyst in each of the depolymerization and the polymerization processes.

For optimal performance, the polymer should be selected based on the temperature range in which it depolymerizes and polymerizes, wherein in the power plant condenser cycle the temperature range of depolymerization is comparable with the power plant's cooling system operating temperatures, and the temperature range of polymerization exceeds the hottest ambient air summer temperatures at the site. Other temperature ranges may be suitable in other applications, and therefore other polymers may be more suitable.

In an exemplary embodiment of the disclosed technology, the liquid polymer is paraldehyde, which is depolymerized in the DCU into the light monomer acetaldehyde over an acid based catalyst. The acetaldehyde rich vapor, having a small amount of paraldehyde gas, is actively removed from the DCU as vapor using a blower, compressor or vacuum pump. This active removal of acetaldehyde rich vapor allows the paraldehyde to be depolymerized beyond its chemical equilibrium. The depolymerization and resulting vaporization process are endothermic, resulting in heat absorption from the source liquid flowing through the heat exchanger of the DCU. The maximum coolant specific energy, estimated based on 100% depolymerization conversion, is 1,434 kJ/kg. In practical operation, the depolymerization process can be controlled by varying operating parameters with high conversion up to 95%, providing a coolant specific energy up to 1,363 kJ/kg to meet cooling needs. This practical coolant specific energy is up to 4 times of the latent heat storage capacity of ice.

In another exemplary embodiment of the disclosed technology, the liquid polymer is paraldehyde, which is depolymerized in the DCU over an acid based catalyst into a liquid mixture of polymer paraldehyde and monomer acetaldehyde at its chemical equilibrium. The liquid mixture then enters the PSU, whereby heat is used to separate the liquid mixture into paraldehyde rich liquid and acetaldehyde rich vapor streams. Using a blower, compressor or vacuum pump, the acetaldehyde rich vapor stream is then received by and regenerated in the PHU as described in the above embodiments. The paraldehyde rich liquid remaining in the PSU and resulting from the regeneration in the PHU, is returned to the DCU to repeat the process. Like the vaporization embodiment above, this depolymerization process is endothermic, resulting in heat absorption from the source liquid flowing through the heat exchanger of the DCU. The maximum coolant specific energy depends on the reaction equilibrium, and is estimated from 36.4 to 191.2 kJ/kg at the temperature range from 4 to 45° C. Although the practical specific energy is lower than the previous embodiment, the cooling rate can be adjusted by regulating polymer feed rate to meet the cooling needs. For example, at a 1 kg/min polymer feed rate, the DCU of this embodiment can provide between 10 and 20 kW cooling at temperature range between 4 and 45° C.

The monomer conversion of acetaldehyde in the polymerization process of the PHU is typically between 60-80%, depending on the process temperature (e.g., ambient air temperature for an air cooled heat exchanger). However, as hereinabove discussed remaining vapor and liquid monomer can be separated from the polymer rich liquid in the PSU, and excess vapor monomer can be recycled back to the polymerization assembly. With this recycling, the overall monomer conversion may reach 95%. Thereby, the exothermic process has polymerization conversions that match the depolymerization conversions for the endothermic process, allowing the cycle to be operated continuously and efficiently as a heat pump cycle by removing heat from the cooling process, and rejecting that heat from the heating process, with overall coolant energy density up to 1,363 kJ/kg.

The disclosed technology further provides a process for an efficient dry cooling system to dissipate low quality heat from chemical, mechanical, thermal, or power plant operations. It can work as a standalone system, or be synchronized with other dry cooling units. Further, it is contemplated that the exothermic polymerization process may be used as a heat source for other processes or purposes, such as for example a distillation unit.

The cycle of the disclosed technology operates based on chemical heat pump fundamentals and utilizes chemical thermal energy storage. Therefore, when the chemical potential is fully utilized and the polymer is allowed to be fully depolymerized into acetaldehyde vapor, it is more tolerant to ambient temperature fluctuation than traditional dry cooling technology such as air cooled heat exchangers. For example, at an ambient temperature of 45° C., air cooling of a 45° C. water stream is impossible since there is no driving force for the heat transfer between water and air. With the cycle of the disclosed technology at the same ambient temperature condition, the endothermic process will lower the coolant/polymer temperature, allowing heat transfer between the water and the coolant. Using paraldehyde as the polymer, even under conditions when the coolant/polymer is fed at temperatures higher than the hottest ambient temperatures, the coolant performance will observe less than 1.4% performance penalty per 10° C. increase in polymer temperature. This behavior is caused by the small ratio between the paraldehyde sensible heat capacity and the overall reaction specific enthalpy change. Specifically, the sensible heat capacity for paraldehyde is 0.27 kJ/mol/C; therefore, the sensible heat storage for 10° C. temperature change is only 2.7 kJ/mol, which only accounts for 1.4% of total reaction heat (189.5 kJ/mol). For example the increase in the polymer temperature from 25-35° C. reduces the DCU cooling capacity by 1.4% (for example, a polymer feed at 25° C. that gives a DCU cooling capacity of 1 kW; when its temperature increases to 35° C., its cooling capacity is reduced to 0.986 kW). Similarly, the monomer will regenerate in the polymerization process with a process temperature higher than the ambient 45° C. temperature, allowing heat to be rejected to the environment using a traditional air cooled heat exchanger. Thus, the monomer-vapor cycle of the disclosed technology allows the system to provide efficient cooling at high ambient temperatures, when traditional dry cooling methods fail.

Furthermore, directed energy systems such as high energy lasers (HELs) are often designed with a thermal management system (TMS) to operate within a specific temperature range, where diode efficiency is highest, allowing maximum conversion of input energy into directed energy. Therefore, manufacturers may specify a coolant flow rate range and temperature range in the TMS to ensure the temperature of the diode and other components of the HEL are maintained close to the optimal temperature. The disclosed technology cycle, systems and methods can be used to provide highly efficient cooling to this coolant, ensuring it returns to the directed energy components within the specified temperature and flow rate ranges. By this configuration, the HEL has a low SWaP and is capable of continuous operation.

BRIEF DESCRIPTION OF FIGURES

Embodiments of the invention will now be described in conjunction with the accompanying drawings, where.

DETAILED DESCRIPTION

Figure 1:
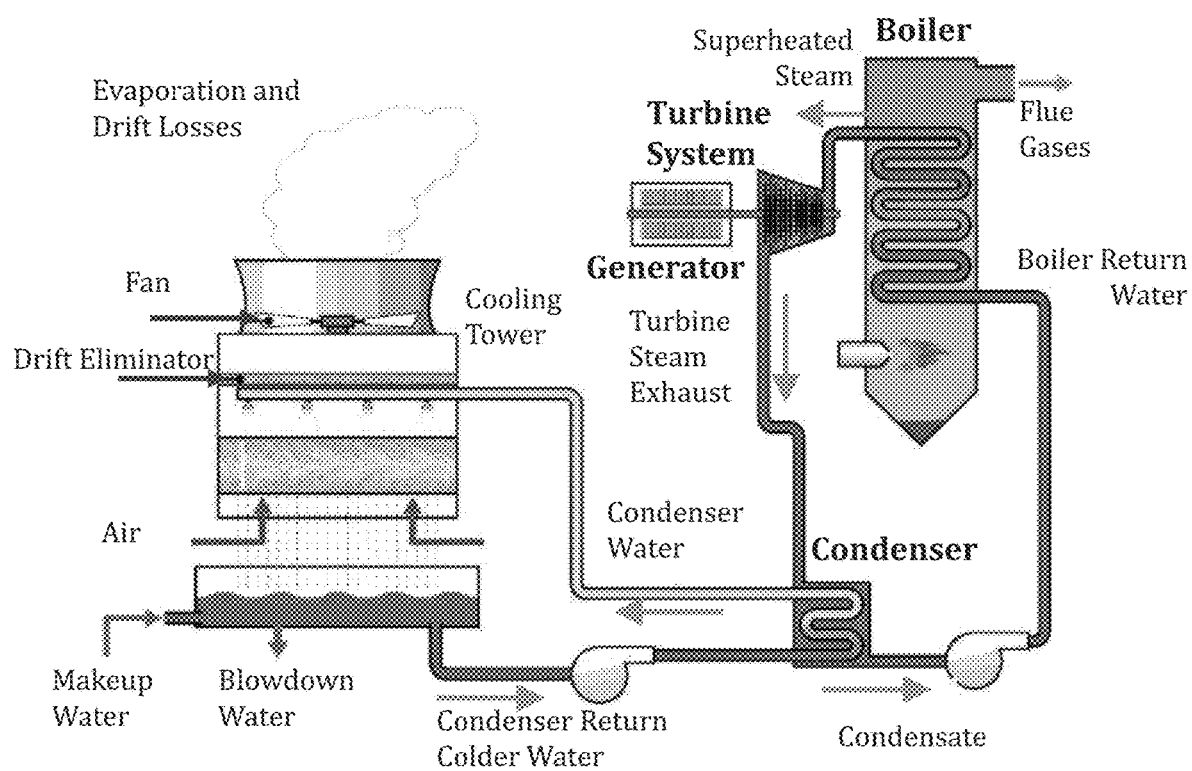
FIG. 1 is a flow diagram of a prior art thermoelectric coal or natural gas fire steam power plant, using a cooling tower wet cooling system.

The features and principles of the disclosed technology are described in details and through embodiments below, with reference to the indicated figures. The particular embodiments of the disclosed technology are presented as examples, and should not be understood as limitations of the claimed inventions. The novel features of the disclosed technology can be employed as numerous embodiments within the scope of the disclosed technology. Additional heat exchangers, pressure regulating control devices, and other ancillary equipment necessary for operation of the disclosed technology in accordance with the teachings of this disclosure, the use of which are well known in the art, are not shown in the schematic figures. A person skilled in the art may readily see that various configurations of heat exchangers, pumps, blowers and other standard processing equipment may be employed to achieve desired process stream temperatures and pressures, while maximizing the overall process thermal efficiency.

The present technology uses a depolymerization and polymerization thermochemical cycle to provide dry cooling to a condenser or other water source, eliminating water losses and maintaining power plant thermal efficiency even during the hottest time of the year. One of polymers suitable for use in the disclosed technology is paraldehyde, which depolymerizes to the monomer acetaldehyde. Other systems may use polymers with higher depolymerization temperatures when appropriate for purposes of the system, for example when the system is used to cool low quality waste heat streams (<200° C.).

The disclosed technology uses polymerization [paraldehyde (Pa(l):$C_6H_{12}O_3$(l))], depolymerization [acetaldehyde (A(l):$CH_3CHO$)] and vaporization [acetaldehyde ((A(g): $CH_3CHO$))] thermochemical reactions cycle for cooling purposes. The equations representing the chemical reaction of the depolymerization of paraldehyde and vaporization of acetaldehyde are indicated in equations 1 and 2:

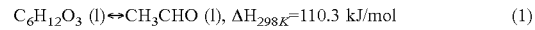
$$C_6H_{12}O_3 \text{ (l)} \leftrightarrow CH_3CHO \text{ (l)}, \Delta H_{298K}=110.3 \text{ kJ/mol} \quad (1)$$

$$3CH_3CHO \text{ (l)} \leftrightarrow 3CH_3CHO \text{ (g)}, \Delta H_{298K}=79.2 \text{ kJ/mol} \quad (2)$$

The net reaction is then:

$$C_6H_{12}O_3 \text{ (l)} \leftrightarrow 3CH_3CHO \text{ (g)}, \Delta H_{298K}=189.5 \text{ kJ/mol} \quad (3)$$

One mole of liquid paraldehyde is depolymerized over an acid catalyst, into three moles of gaseous acetaldehyde. The depolymerization reaction is endothermic with a net reaction heat of 189.5 kJ/mol (as the sum of reaction heat and vaporization heat).

The system of the disclosed technology utilizes the high reaction heat of the depolymerization of paraldehyde for cooling a source liquid. With its net reaction heat of 189.5 kJ/mol, the heat capacity of the system can be calculated by equation 4, where 132.16 g/mol is the paraldehyde molecular weight.

$$189.5 \frac{\text{kJ}}{\text{mol}} \div 132.16 \frac{\text{g}}{\text{mol}} \times 1000 \frac{\text{g}}{\text{kg}} = 1,434 \frac{\text{kJ}}{\text{kg}} \quad (4)$$

The 1,434 kJ/kg is the maximum theoretical cold energy storage achievable. The depolymerization processes operate in the temperature range of 4-45° C., under pressure applied in a range of 3-14.7 pound per square inch absolute (psia);

Although the depolymerization reaction is reversible, it can be promoted by the removal of the monomer, such as by means of vaporization. Specifically, in a typical depolymerization reaction without the active removal of light monomer, the reaction will start first by depolymerizing the polymer to produce light monomer. However, because this is a reversible reaction, as the polymer is being depolymerized, the produced light monomer will try to convert (re-polymerize) back to the polymer. The depolymerization and re-polymerization rates depend on the concentration of the polymer and the light monomer in the liquid at a given temperature and pressure. In general, higher concentrations will result in a faster reaction rate. Therefore, high polymer concentration will lead to a high depolymerization rate and high light monomer concentration will lead to a high re-polymerization rate. Eventually, both polymer and light monomer concentrations in the liquid will reach a state where the depolymerization and re-polymerization rate are equal and the polymer and monomer concentrations will remain constant. Thus the depolymerization conversion and the coolant specific energy is limited by the reaction equilibrium. The limitation, however, does not limit the cooling rate as the cooling can also be adjusted by regulating the polymer flow rate into the DCU.

At the equilibrium state, the resulting mixture is a liquid and the monomer (having a very low boiling point as compared to the polymer) will slowly evaporate from the liquid mixture. Actively removing the monomer rich vapor from the DCU (by means of a blower, for example) creates a low pressure environment, accelerating the evaporation rate of the monomer. As the light monomer concentration decreases (through both removal of the monomer and additional polymer feed), the depolymerization reaction dominates to produce more light monomer to reach the equilibrium.

For example, at 40° C., the equilibrium polymer and light monomer concentrations are about 80 wt % and 20 wt % in liquid, respectively. If pure polymer is fed to the DCU and evaporation is negligible, the overall depolymerization conversion is calculated based on liquid composition (20%). The coolant specific energy calculated based on the reaction heat is 20% of the maximum theoretical cold energy storage achievable or 286.8 kJ/kg. By equalizing the evaporation rate (by removal of the monomer rich vapor) and the polymer feed rate, the overall depolymerization conversion is calculated based on the vapor composition. If the vapor composition is 90 wt % of light monomer (average light monomer composition under test conditions), the overall depolymerization conversion is 90%. The coolant specific energy calculated based on the reaction heat is 90% of the maximum theoretical cold energy storage achievable or 1290.6 kJ/kg. Thus, by active removal of the monomer from the reaction tank the overall depolymerization conversion and the coolant specific energy are significantly higher than the equilibrium conversion.

After depolymerization, acetaldehyde gas can be re-polymerized to paraldehyde liquid over an acid catalyst. The polymerization process (acetaldehyde to paraldehyde) operates in the temperature range of 26–55° C., under pressure ranges from 10 to higher than 14.7 psia; in the embodiments herein described, pressure from a blower is applied on the polymerization process in the range of 10-25 psia.

Figure 2:
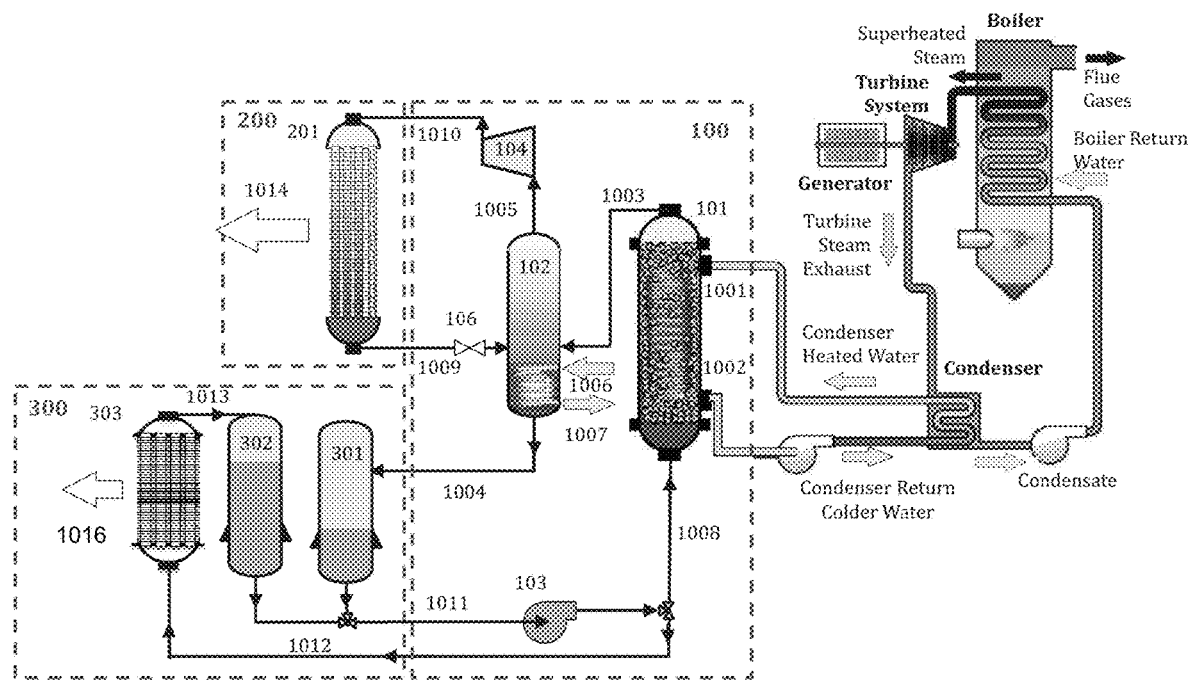
FIG. 2 is a flow diagram of a thermoelectric coal or natural gas fire steam power plant, including an embodiment of the apparatus of the disclosed technology in an indirect dry cooling configuration.
Figure 3:
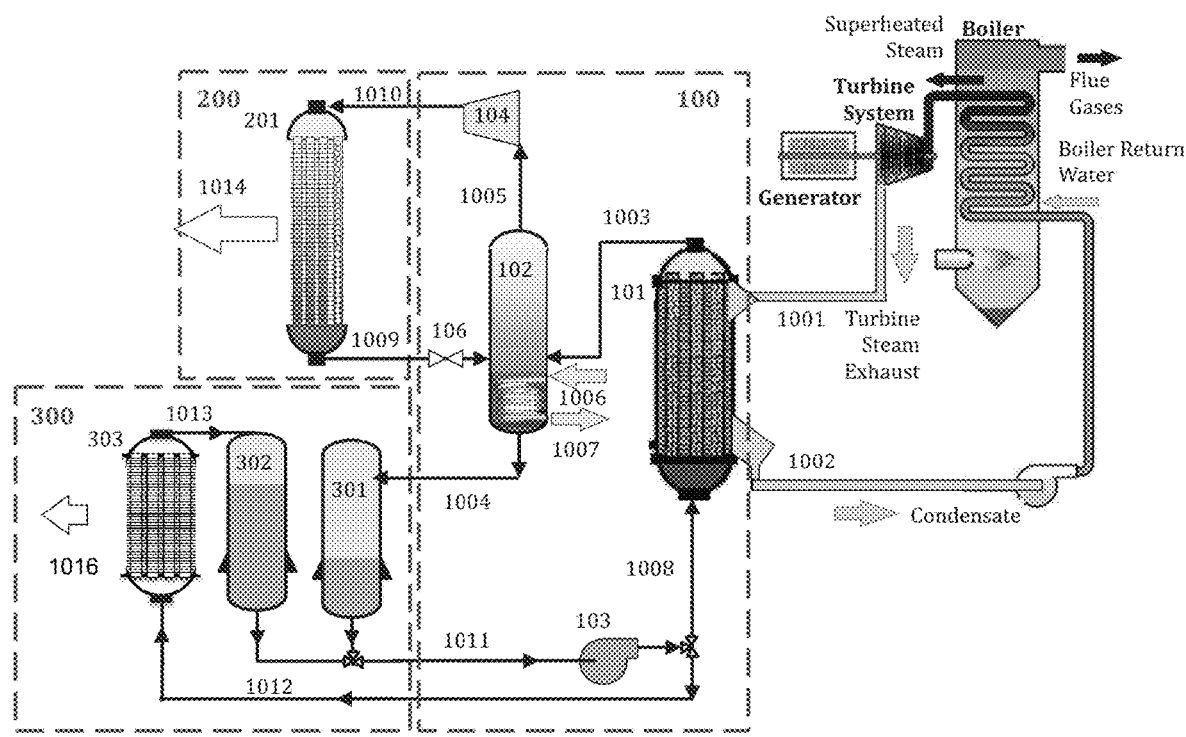
FIG. 3 is a flow diagram of a thermoelectric coal or natural gas fire steam power plant, including an embodiment of the apparatus of the disclosed technology in a direct dry cooling configuration.
Figure 4:
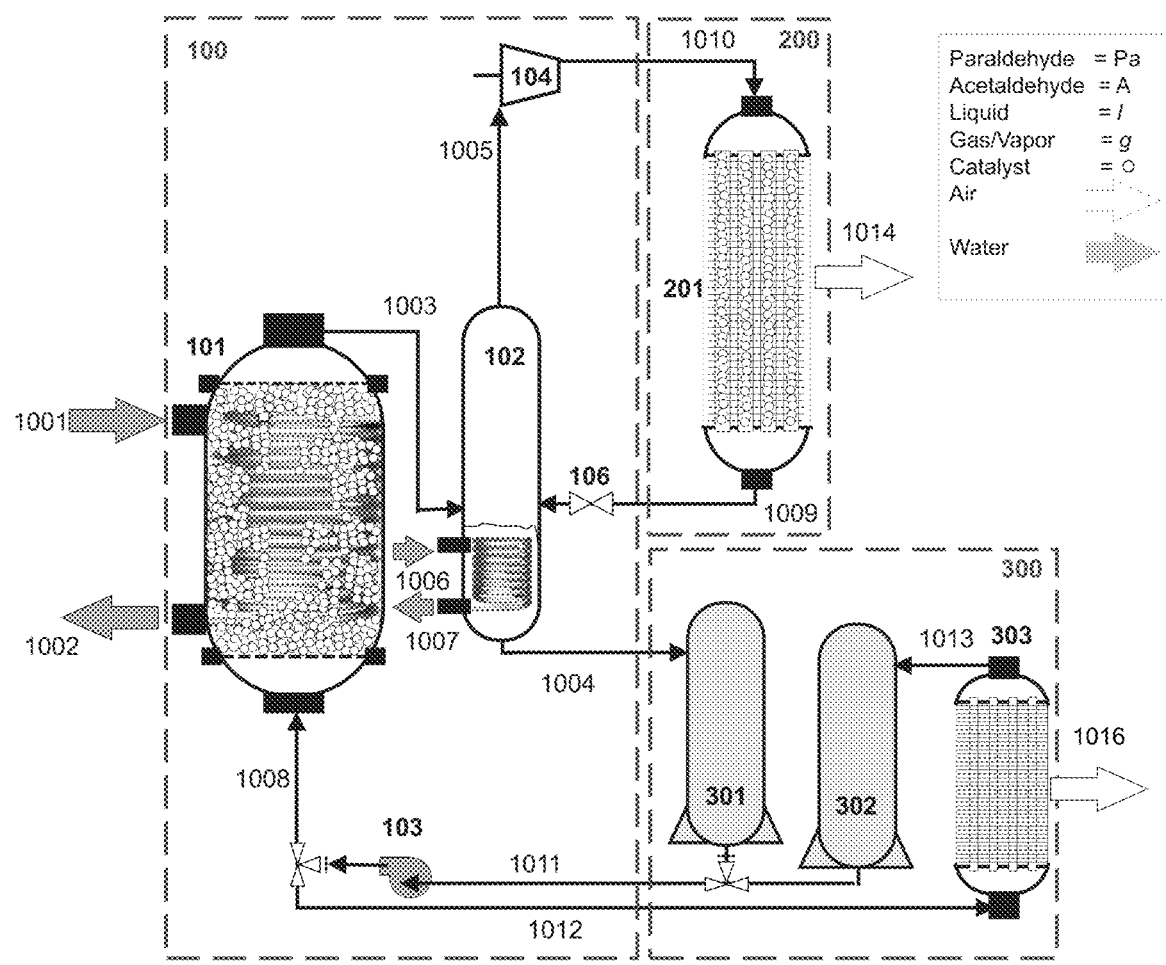
FIG. 4 is a schematic process flow diagram of an embodiment of the apparatus of the disclosed technology, using cold energy storage.

Shown in FIGS. 2-4 are schematic process flow diagrams of embodiments of the disclosed technology, including an apparatus that includes cold energy storage, having three distinct assemblies in liquid communication: a depolymerization assembly 100, a polymerization assembly 200, and cold energy storage assembly 300. In these embodiments the depolymerization assembly 100 includes a DCU 101, a PSU 102, a liquid pump 103, and a blower 104. The polymerization assembly 200 includes a PHU 201. The cold energy storage assembly 300 includes a day storage tank (DST) 301, a polymer cooling unit (PCU) 303 and a cold-energy storage tank (CST) 302. Each of the DCU 101 and the PHU 201 of the assemblies are configured as heat exchangers, wherein catalytic reactions occur and heat is exchanged. The PSU 102 and the PCU 303 are also configured as heat exchangers, although no catalytic reaction is intended in these tanks. The DST 301 and CST 302 are all storage tanks, not intended to be significant heat exchangers. The tanks and vessels should be made from materials that are compatible with the selected system polymer and its monomer; stainless steel is a suitable material for these tanks and vessels. The DCU 101 and the CST 302, and other heat exchanger vessels and tanks of the embodiments of the disclosed technology may be wrapped in heat insulation, designed as double walled tanks, or may otherwise be insulated from ambient air conditions.

The configuration of the heat exchanger tanks 101, 102, 201, and 303 may be independently configured to maximize heat transfer and obtain the right temperature at the flows' exit. The DCU 101 and the PSU 102 are heat exchangers designed to receive source liquid, and transfer heat therefrom to the respective depolymerization and separation reactions within the tanks. Liquid to multiphase fluids heat exchangers, such as shell and tube heat exchangers, with straight or coiled tubes, counter or parallel flow, single or double pass, are all suitable heat exchangers to accomplish this heat transfer; other heat exchangers may also be suitable for purposes of these reactors of the disclosed technology. The DCU 101 includes a depolymerization chamber and a conduit through which a source liquid cycles, with an acid based catalyst in the polymer flow portion of the depolymerization chamber.

The PSU 102 may be a vapor-liquid separator designed with the inlet mixtures from the DCU 1003 and the PHU 1009 to be separated to monomer rich vapor 1005 (at this stage, greater than 80 wt % monomer, and in some embodiments greater than 90 wt % monomer gas) and polymer rich liquid 1004 (greater than 80 wt % polymer, and in some embodiments greater than 90 wt % polymer liquid), under the applications' pressure and temperature conditions. A pressure regulating valve 106 is used to control the amount of mixture from PHU 201 to PSU 102 so that the pressure difference between the two units is properly maintained at the ranges described hereinabove. Other vapor-liquid separator designs including, but not limiting to, fractionation and distillation column design, can also be employed in the PSU to provide high separation efficiency and effectiveness. In some embodiments, a level control mechanism such as a float level switch is used to allow the accumulation of the polymer rich liquid at the bottom of the PSU; when the level is reached, the PSU outlet port is opened and the accumulated polymer rich liquid stream is discharged from the PSU.

The PHU 201 may be configured as an air-to-gas/multiphase heat exchanger, such as a tube and fin heat exchanger, with an acid based catalyst in the monomer/polymer flow portion of its polymerization chamber. The PCU 303 may be configured as an air-to-liquid heat exchanger, such as a tube and fin heat exchanger. Other heat exchanger configurations may be suitable for purposes of these reactors of the disclosed technology.

Figure 5:
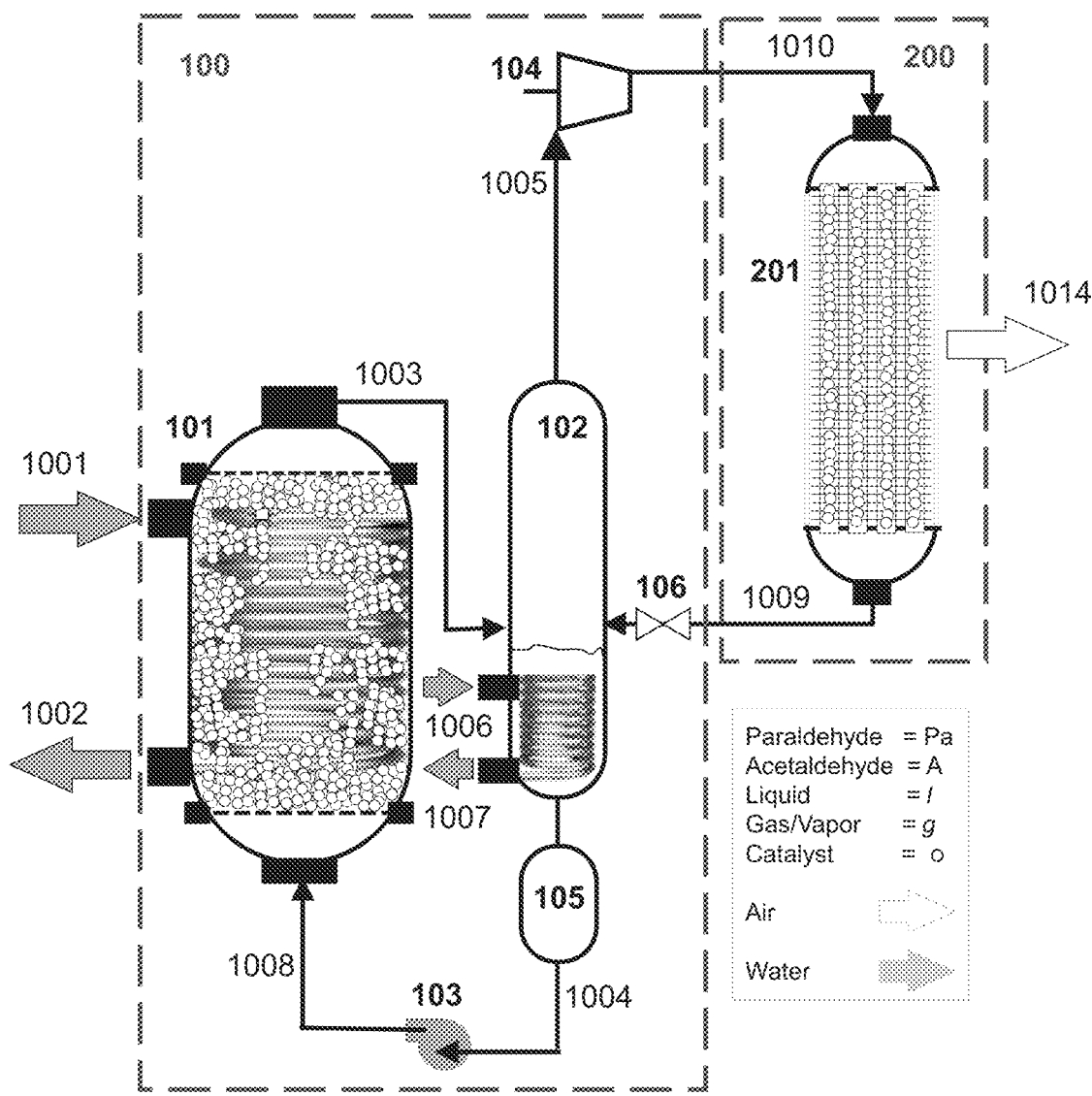
FIG. 5 is a schematic process flow diagram of another embodiment of the apparatus of the disclosed technology as an uninterrupted cooling cycle, without cold energy storage.

The embodiment of FIG. 5 includes an uninterrupted cooling cycle apparatus, without cold energy storage. The components and operating parameters of this embodiment are similar to the components in the afore-described system having cold energy storage, but without the large storage tanks of the cold energy storage assembly. Specifically, in this embodiment the rich liquid polymer mixture is stored in a much smaller polymer storing tank (PST) 105, and then pumped to the DCU 101, providing uninterrupted cooling cycle operations. The PST may be sized to hold about one-half of the polymer needed for one cycle through the system of the present disclosure.

Figure 8:
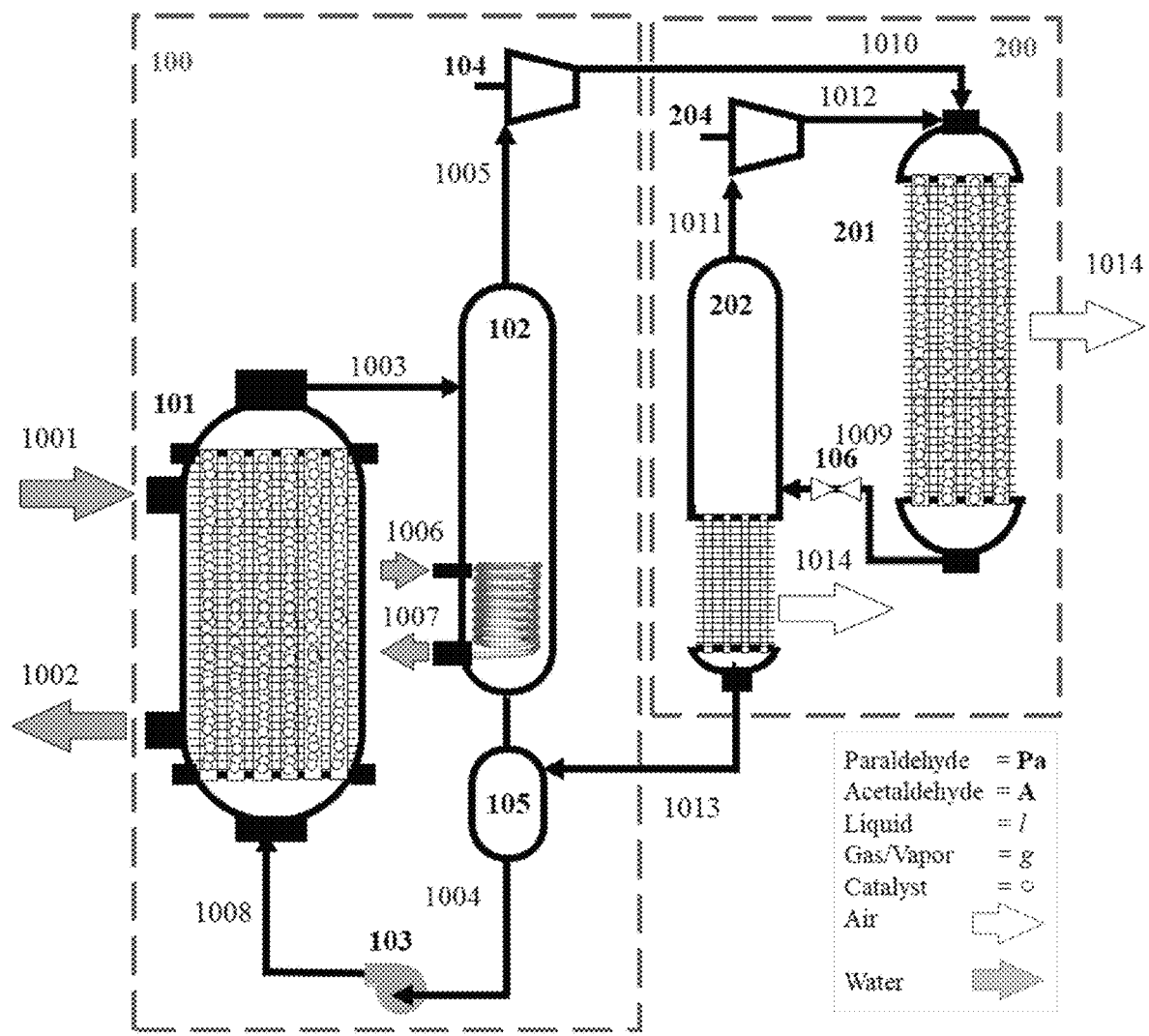
FIG. 8 is a schematic process flow diagram of an embodiment of the apparatus of the disclosed technology, using two PSUs.

In some embodiments, as shown in FIG. 8, the system comprises two or more PSUs, for example with a first PSU 102 positioned after the DCU 101, receiving streams of monomer rich vapor, and by its heat exchanger configuration further separating out monomer gas from polymer gas before conveying the vapor to the PHU 201, and a second PSU 202 positioned after the PHU 201, receiving streams of polymer rich liquid, and further separating out monomer liquid (which evaporates in PSU 202 to monomer gas) therefrom before conveying the polymer rich liquid to the PST 105 or the DCU 101. The polymer rich liquid from the first PSU 102 and the second PSU 202 in this embodiment may then be conveyed to the PST 105 for later depolymerization by the DCU, and the monomer gas from the first PSU 102 and the second PSU 202 may be conveyed back to the PHU for polymerization. A second blower 204 may also be provided to actively remove monomer gas from the PSU 202. In this embodiment, either ambient air or condenser cooling water may be used to supply heat to the PSUs 102, 202.

In these embodiments source liquid 1001, 1006, such as coolant water is conveyed to the conduit of the DCU and, in some embodiments the PSU(s), by means of an external pump (not shown), such as the cooling water pump of the condenser. The flow rate of the source liquid through the heat exchanger tubes can be controlled by means of the pump so that the temperature of the source liquid upon discharge from the DCU tube is near or at the optimum temperature of the turbine (35-52° C.).

Inlet and outlet ports or valves may be positioned within the system of the disclosed technology to control fluid flow. The pumps used in association with or as part of the system of the disclosed technology may be controlled by a pump control system, which may receive signals from sensors within the DCU and the PSU, for example, and other heat exchangers, tanks and lines of the disclosed technology, to pump additional source liquid through the DCU or the PSU, additional polymer into the DCU, additional monomer rich gas from the DCU, and deliver polymer liquid to the CST, or from the CST to the PCU, or otherwise control the flow of liquids and vapor through the system of the disclosed technology to reach the desired source liquid temperature and optimize operation of the system.

The DCU 101 is an endothermic reactor, with a heat transfer surface (at its tubes, for example) allowing the reaction process in the depolymerization chamber to absorb heat from the source liquid cycled into the DCU tubes (conduit) at 1001. The conversion from a polymer to a monomer liquid and the vaporization of the monomer liquid occur over a catalyst in the polymer coolant flow portion of the reactor; because this reaction is endothermic, it absorbs a significantly large amount of heat from the circulating source liquid, at the heat transfer surface. The polymer may be continuously cycled into the DCU vessel at 1008; when ambient temperatures make supplemental cooling desirable, the cool liquid polymer stored in the CST 302 is pumped into the DCU 101 from the stream 1011. A monomer rich vapor mixture is withdrawn from the DCU vessel at 1003, under a low pressure effect provided by the blower 104. This depletion of the monomer in the DCU forces the depolymerization reaction to promote further polymer depolymerization in reaching chemical equilibrium. For paraldehyde, depolymerization and vaporization occurs at any temperature at or above 4° C.; operating temperatures of 10-45° C. within the DCU appear to maximize depolymerization and vaporization. Flow rate of the paraldehyde into the DCU at 1008 in the range of 20-39 grams/minute, under pressure in the range of 3-12 psia, results in a cooling rate of 0.3-1.0 kW with a 90 wt % conversion achieved by actively removing monomer vapor, and a cooling rate of 0.07-0.2 kW with a 20 wt % conversion without actively removing monomer vapor. The temperature of the source liquid as it exits the DCU at 1002 may be controlled by the flowrate of the source liquid, the polymer feed rate and the rate of withdrawal of the monomer rich vapor.

In the embodiments shown in FIGS. 2-5, under the influence of blower 104, the monomer rich vapor mixture (A(g) and Pa(g)) flows first to PSU 102, in stream 1003. The blower applies pressure to the tanks of the depolymerization assembly (and the cold storage assembly of FIGS. 2-4) in the range of 3-12 psia, to cause monomer gas separation and active removal of the monomer rich vapor from each of the DCU and the PSU. The blower exit pressure is in the range of 10-25 psia, forcing the vapor mixture from the PSU to flow into the PHU.

In these embodiments, the PSU 102 also acts as a buffer tank between the DCU 101 and the PHU 201, minimizing the impact of the sudden change in ambient conditions on the DCU operation, and allowing the system to operate continuously with no material imbalance. In the PSU 102, further separation of the monomer gas from the polymer gas occurs, using an independent stream of source liquid 1006, 1007 as the heat source, and further adding more cooling capacity to the system (wherein the stream of source liquid exiting the PSU may be mixed with the cooler source liquid exiting the DCU, or may be circulated through the DCU for further cooling). Specifically, the heat from the source liquid separates monomer gas and polymer liquid. The flow of condenser cooling water as a source liquid may be achieved by the condenser pump, and regulated to control the heat provided thereby within the PSU. The separated monomer rich stream then flows to the PHU 201, under the pumping pressures of the blower 104, in flow streams 1005 and 1010. The temperature of stream 1010 is intended to be close to ambient temperature. In some embodiments another heat exchanger is placed before the PHU to cool stream 1010 to near ambient temperatures, thereby limiting the reaction temperature in the PHU.

In the PHU 201, the monomer gas (A(g)) is polymerized over an acid catalyst to a polymer rich liquid (Pa(l)). The acid catalyst is positioned in the polymerization chamber of the PHU, and may be provided in a spherical (bead) form, packed inside of the heat exchanger as a packed bed reactor. Supporting metal screens or perforated mated plates may be positioned at both ends of the heat exchanger tube(s) to hold the catalyst bed in place, while allowing the monomer to flow through the catalyst bed. In the embodiment, where the polymer is paraldehyde, acetaldehyde is polymerized back to paraldehyde, over a catalyst, at a temperature range between about 26-55° C., and a pressure range between 10 and 25 psia.

This polymerization over an acid catalyst is an exothermic process, where the temperature of the monomer and polymer increases above ambient temperature. Heat is expelled at 1014 from the PHU to the ambient environment at a heat transfer surface. In some embodiments the PHU heat exchanger consists of multiple finned tubes, with ambient air being blown across the surface of the finned tubes. The fins on the tube increase heat transfer surface area and allow efficient heat rejection from the PHU to the atmosphere. A fan can be configured to either blow or pull air across the PHU for efficient heat removal at 1014.

In the embodiments shown in FIGS. 2-5, the PHU produces a polymer rich liquid mixture which flows back to the PSU 102 in flow stream 1009. The pressure differential between the PHU 201 and PSU 102 is regulated by blower 104 in the path of flow stream 1005, 1010 as hereinabove described, and through a pressure regulating valve 106 or an orifice, a pump, or a combination of all or any of these devices, in the path of flow stream 1009. By means of the circulating plant condenser cooling water 1006, 1007, the PSU heat exchanger further vaporizes monomer gas from the polymer rich liquid mixture, and a more concentrated polymer rich liquid stream is then expelled from the PSU to the DST 301 (or as shown in FIG. 5, directly back to the PST 105 to the DCU 101), in flow stream 1004. In some embodiments (for example, see FIG. 8) a second PSU is provided for this separation of monomer gas from the polymer rich liquid mixture, wherein the monomer gas is evaporated from the liquid and recirculated through the PHU 201.

It is noted that the monomer rich gas from the depolymerization assembly comprises up to 20%, or in some embodiments less than 10%, polymer gas; likewise, the polymer rich liquid from the polymerization assembly comprises up to 20%, or in some embodiments less than 10%, monomer liquid. The PSU(s) further separate the monomer from the polymer, in each of these states.

In the embodiment shown in FIGS. 2, 3 and 4, if necessary to cool the liquid polymer at night for next day operation, the liquid polymer is stored in the DST 301 and when the ambient air is cooler is pumped by pump 103 to PCU 303, by stream 1011 to 1012. The PCU 303 cools the liquid paraldehyde using the colder night ambient air, expelling heat at 1016. The cooled liquid paraldehyde then flows to the CST 302 for storage, in flow stream 1013, and is ready for the next day operation and/or conveyance to the DCU by streams 1011 to 1008.

Programmable three-way valves may be used to control the flow pattern of the polymer rich liquid through and from the cold energy storage assembly, including for example (a) from the CST 302 to the DCU 101 (during the day's high ambient temperature), (b) from the DST 301 to the PCU 303 and CST 302 (during the cooler night ambient temperatures), (c) from the DST 301 to the DCU 101 (when the CST 302 is depleted, or the ambient temperature is not too high for the depolymerization reaction), or (d) to control the liquid pump 103 discharge flow either to the DCU 101 or PCU 303. Additional valves may be provided throughout the system to control fluid flow, such as for example, between the PHU and the PSU.

The catalyst within the DCU and the PHU may be the same or different acid based catalysts (except when used in a heat pump, as hereinafter described, wherein the catalysts must be the same), suitable for polymerization or depolymerization of the selected polymer. It is believed that most strong acid based catalysts would be suitable for use in the process of the disclosed technology. Examples of strong acid based catalysts suitable for use with the polymer paraldehyde include perflurosulfonic acid and sulfonic acid, such as Amberlyst 47, Amberlyst 15, Amberlyst, Amberlite, Amberjet, Purolite, Nafion NR and Nickle Sulfate. The catalyst resin (in all or some of the catalytic heat exchangers) may be acid, silica or activated carbon based. Favorable functions in a selected catalyst are high reaction rate with the selected polymer and high coefficient of heat transfer. Packing material, such as metal, may be incorporated into the resin bed to allow the use of less catalyst and maximize the heat transfer area within a tank.

As an example, Table 1 indicates the flow rate, temperature, pressure, enthalpy, composition and phases for the streams defined in FIG. 4. The thermodynamic states were calculated for a 100 MW$_{th}$ cooling plant and represent the conditions for steady state operation of the system.

TABLE 1

Comparison of Heat Capacity and Energy Use

| | Units | 1011 | 1008 | 1003 | 1005 | 1010 | 1009 | 1004 | 1013 | 1001 | 1002 |
|---|---|---|---|---|---|---|---|---|---|---|---|
| Phase | [—] | Liquid | Liquid | Vapor | Sat Vapor | Vapor | Sat. Liquid | Sat. Liq. | Liq | Liq | Liq |
| Quality | [kg Vap./kg Liq.] | 0.0 | 0.0 | 1.0 | 1.0 | 1.0 | 1.0 | 0.0 | 0.0 | 0.0 | 0.0 |
| $X_{Ac}$ | [massf liq.] | 0.1 | 0.1 | — | — | — | 0.2 | 0.1 | 0.1 | 0.0 | 0.0 |
| $X_{H2O}$ | [massf liq] | 0.0 | 0.0 | 0.0 | 0.0 | 0.0 | 0.0 | 0.0 | 0.0 | 1.0 | 1.0 |
| $Y_{Ac}$ | [massf vap] | — | — | 0.9 | 0.9 | 0.9 | — | — | — | — | — |
| Flow Rates | [kg/s] | 82.2 | 82.2 | 82.2 | 95.8 | 95.8 | 95.8 | 82.2 | 82.2 | 2,234 | 2,234 |
| Temp. | [° C.] | 38.0 | 38.0 | 30.0 | 30.0 | 62.0 | 39.0 | 40.0 | 38.0 | 40.0 | 30.0 |
| Pressure | [psi] | 7.4 | 7.4 | 7.4 | 7.4 | 13.0 | 13.0 | 7.4 | 7.4 | 31.5 | 29.1 |
| Enthalpy | ×10³ [kJ/kg] | −5.07 | −5.07 | −3.94 | −3.94 | −3.90 | −5.01 | −5.1 | −5.1 | −15.9 | −15.9 |

FIG. 2 shows a flow diagram of an embodiment of the disclosed technology as used for cooling the condenser cooling water in a power plant; FIG. 3 shows a flow diagram of an embodiment of the disclosed technology as used as the condenser in a power plant.

Figure 6:
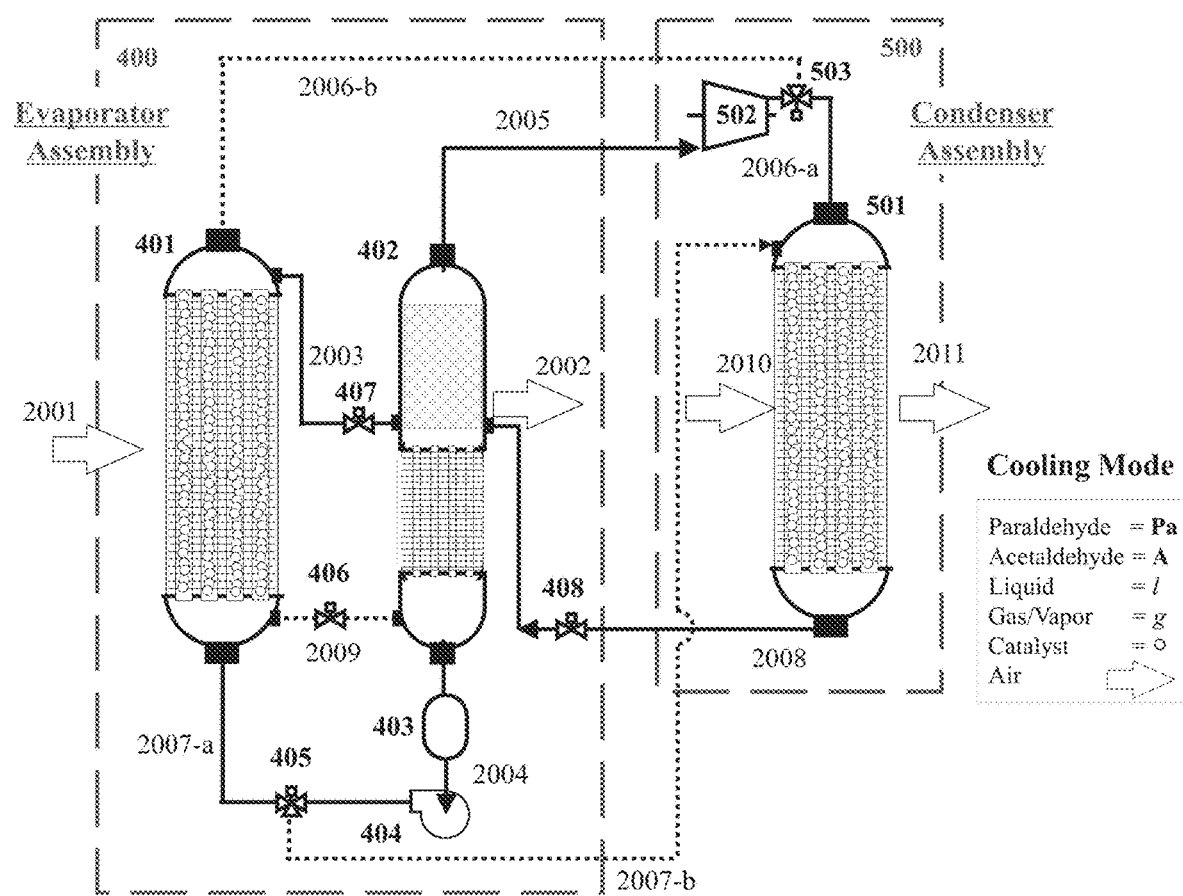
FIG. 6 is a schematic process flow diagram of another embodiment of the apparatus of the disclosed technology, using an uninterrupted heatpump in the cooling cycle.
Figure 7:
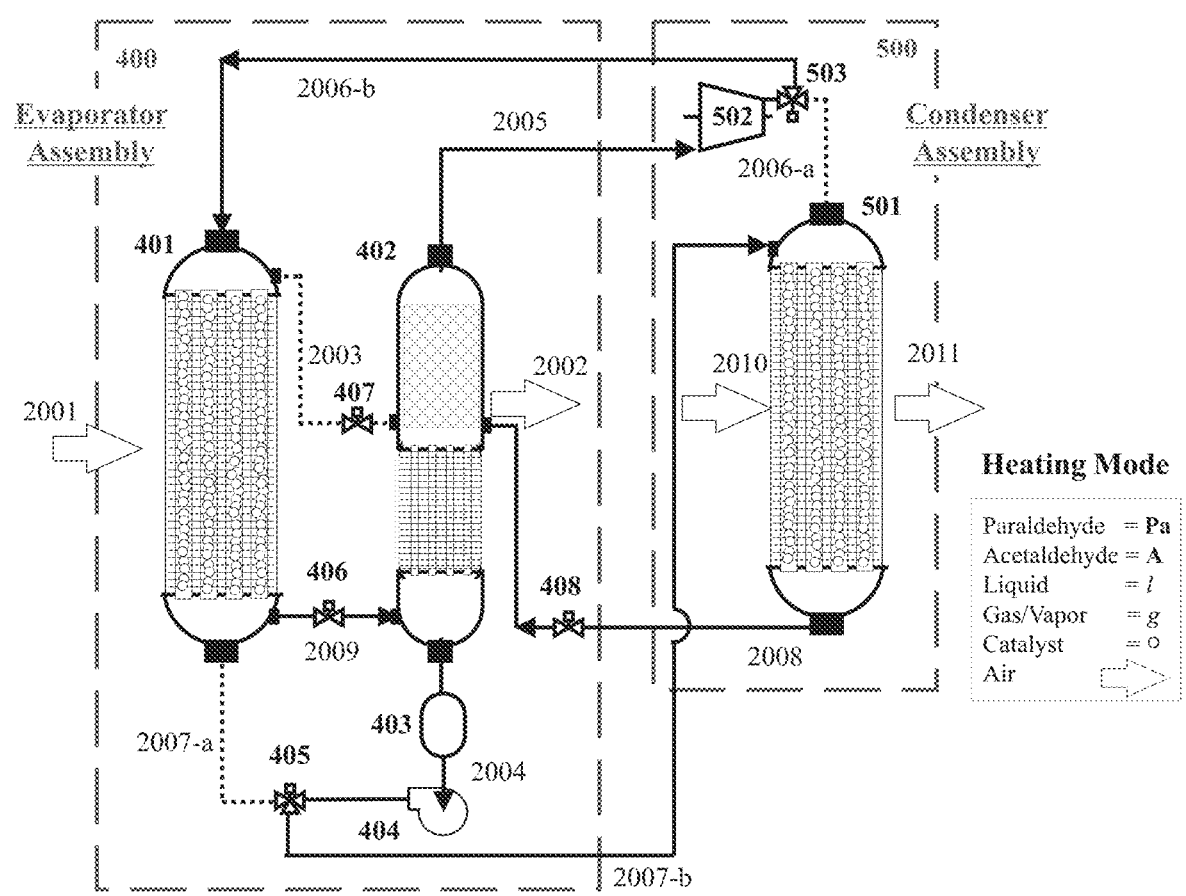
FIG. 7 is a schematic process flow diagram of the embodiment of FIG. 6, in the heating cycle.

In another embodiment of the disclosed technology, as shown in the schematic process flow diagram of FIGS. 6 and 7, a reversible heat pump space cooling and heating cycle apparatus and method is provided. In this embodiment two heat exchangers 401 and 501 are provided to depolymerize and polymerize the polymer/monomer conveyed through the system, in the traditional heat pump evaporator assembly 400 and condenser assembly 500. The components of this embodiment are similar to the components in the dry cooling embodiment without cold energy storage described above, with an expansion device 408 and several control valves 405, 406 and 407, wherein the heat exchanger 401 and the PSU 402 (at 2001/2002) are air-to-liquid or to-multiphase heat exchangers.

As shown in FIG. 6, in the cooling mode the heat exchanger 401 of the evaporator assembly 400 functions as a depolymerization cooling unit, in liquid communication with a PSU 402, a polymer storing tank (PST) 403, a liquid pump 404, two two-way automatic control valves 406 and 407, and expansion valve 408. The automatic control valve 406 provides expansion valve functions when the flow is directed towards the PSU 402. In this mode the heat exchanger 501 of the condenser assembly functions as the polymerization heating unit, in liquid communication with a 3-way automatic control valve 503. Polymer and its depolymerized monomer flow among the heat exchangers 401 and 501, with a PSU 402 further separating the monomer and polymer, as described in the embodiments above, by flow lines 2003, 2005, 2006-*a*, 2008, 2004 and 2007-*a*. A blower, compressor or vacuum-pump 502 is provided to actively remove the monomer gas from the heat exchanger 401 and the PSU 402. The blower, compressor or vacuum-pump 502 further generates the pressure ratio between the second heat exchanger 501 and the PSU 402. The pressure in the second heat exchanger 501, in the cooling mode, is regulated by a pressure regulating valve, orifice, pump or a combination of all of these devices 408. Thereby, as air 2001 flows past the heat exchanger 401 and the PSU 402, it is cooled by the depolymerization of the polymer over a catalyst and evaporation of the monomer, and transferred to the heat exchanger 501 at 2006-*a*, wherein heat 2011 from the heat exchanger 501 is expelled to the environment.

In the heating mode (shown in FIG. 7), the flow is reversed, and the first heat exchanger 401 functions as the polymerization heating unit (providing an exothermic reaction of the monomer over a catalyst), and the second heat exchanger 501 functions as the depolymerization cooling unit (providing an endothermic reaction of the polymer over a catalyst). Valves 503, 405, 406 and 407 reverse the flow of the polymer/monomer, so that polymer and monomer flow among the heat exchangers 401 and 501 by flow lines 2004, 2005, 2006-*b*, 2007-*b*, 2008 and 2009. The blower 502 is provided to actively remove the monomer gas from the heat exchanger 501 and the PSU 402. In the heating mode, the pressure between the first heat exchanger 401 and the PSU 402 is regulated through a pressure regulating valve, orifice, pump or a combination of all of these devices 408. Thereby, as air 2001 flows past the heat exchanger 401, it is heated by the polymerization of the monomer over a catalyst, and heat from the environment 2010 and the PSU 402 at 2002 is drawn in by heat exchanger 501, in its depolymerization endothermic reaction, and cool air is expelled at 2011.

Figure 9:
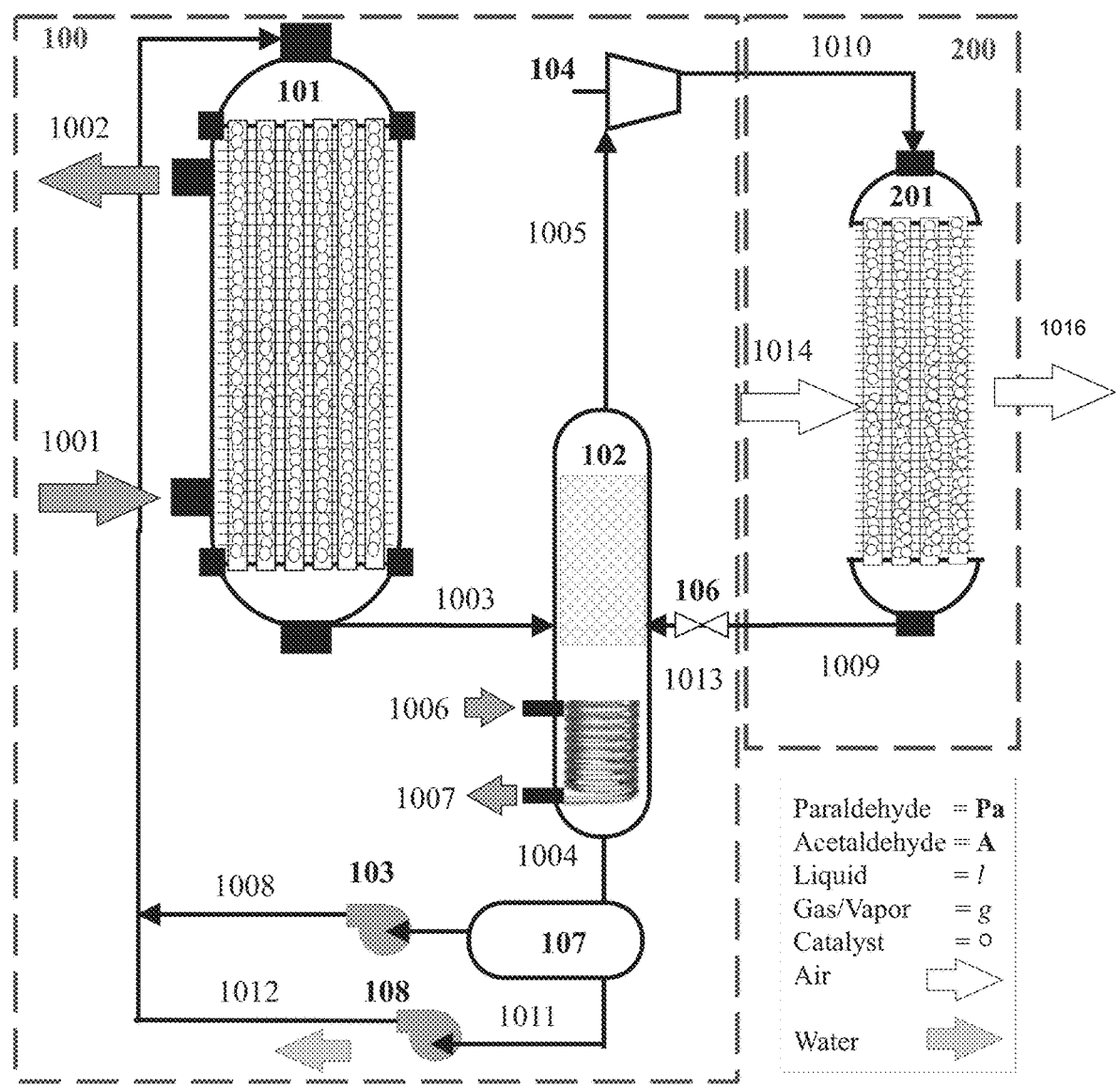
FIG. 9 is a schematic process flow diagram of another embodiment of the apparatus of the disclosed technology, cofeeding water and polymer from the top of DCU.
Figure 13:
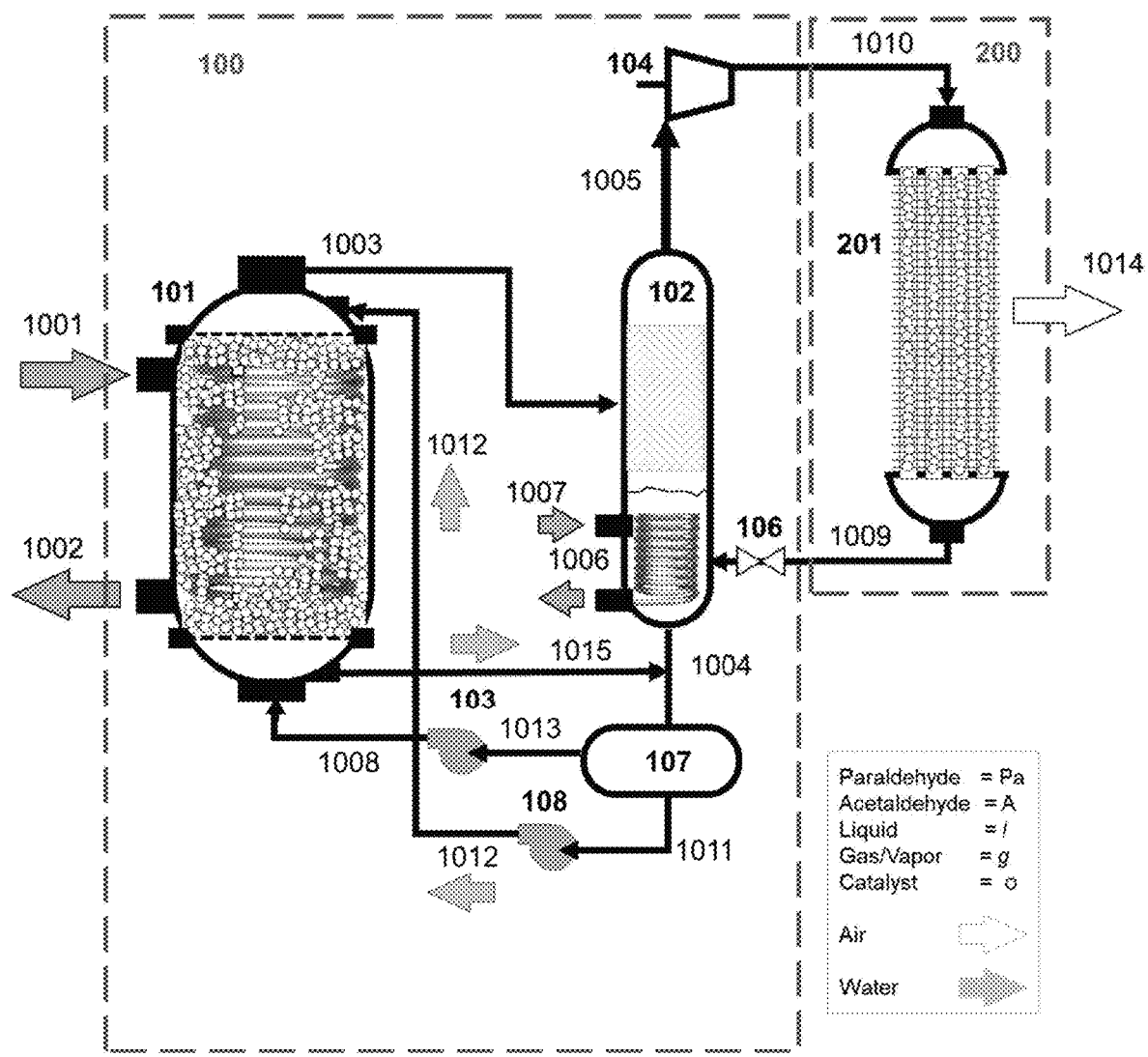
FIG. 13 is a schematic process flow diagram of another embodiment of the apparatus of the disclosed technology, feeding polymer from the bottom of the DCU with water feeding into the DCU from the top.

In another embodiment of the disclosed technology, as shown in FIGS. 9 and 13, water is incorporated into an uninterrupted cooling cycle apparatus without cold energy storage, similar to the embodiment shown in FIG. 5. In this process water is fed into the system of the disclosed technology to inhibit formation of side products or undesired compounds, such as 2-butenal (Crotonaldehyde). 2-butenal is formed by aldol condensation of acetaldehyde (Ac) where the two acetaldehyde molecules link together and form a carbon-carbon bond with the removal of a water molecule. In the presence of a strong acid catalyst, similar to the acid catalyst hereinabove described, the acetaldehyde first forms nucleophilic enol, followed by an acid catalyzed dehydration reaction (loss of water molecule) to form 2-butenal. Although the reaction pathway is in favor of the reversible reaction between polymer and monomer, a small percentage of the 2-butenal can be formed where enol dehydration favors. During the depolymerization of the paraldehyde of the methods of the disclosed technology, 2-butenal may be produced as an intermediate species in the formation of the longer chain polymers. These undesired compounds have the potential to reduce the polymer coolant concentration over long-term operation, resulting in a long term coolant stability issue.

Water was found to be an effective 2-butenal inhibitor in the depolymerization cycle operation and has low solubility with the polymer coolant. In the present embodiments, adding water content up to 10 wt % reduces 2-butenal concentration to zero. In the embodiment shown in FIG. 9, the water is co-fed with the polymer into the DCU 101; in the embodiment shown in FIG. 13, the water is fed into the top of the DCU, and the polymer is fed in the bottom. As shown in the embodiment of these Figures, the water and polymer are fed into the DCU 101 by replacing the PST 105 of the embodiment shown in FIG. 5 with a liquid-liquid separation/storage tank (LST) 107, to facilitate independent feeding of both water at feed stream 1011, 1012 and polymer at feed stream 1013, 1008 to the DCU 101, by means of liquid pumps 108 and 103, respectively, from the LST 107. Water and the polymer are stored in the LST 107 as two distinct layers, with the water layer in the bottom and the polymer layer in the top of the tank, due to the density difference between water and the polymer, and the low solubility of water in the polymer.

Further, in the embodiment shown in FIG. 9, the system of FIG. 5 is further modified so that the water and polymer are co-fed at or near the top portion of the DCU 101. By such configuration, the accumulation of water in the DCU 101 (resulting from the low solubility between the water and paraldehyde, and the slightly higher density of water than paraldehyde) is avoided. In the embodiment shown in FIG. 13, only the water is fed at or near the top portion of the DCU, wherein the excess water accumulating at the bottom of the DCU is removed via stream 1015. These configurations further allow for optimum depolymerization rates, higher chemical conversion, and higher cooling rate.

In the embodiment of FIG. 9, when operating in a cooling process both the polymer and the water are pumped from the LST 107 to the top of the DCU 101, entering the DCU as a combined stream of water and polymer. In the embodiment of FIG. 13, when operating in a cooling process the polymer is pumped from the LST 107 to the bottom of the DCU 101, and the water is pumped from the LST to the top of the DCU. In each embodiment the polymer is pumped in stream 1008, and the water is pumped in stream 1012. The pumping rates of the two pumps 103 and 108 are controlled to maintain appropriate water content in the DCU by up to 10 wt %, and in the embodiment of FIG. 9, to produce a uniform mixture of water and polymer. In the embodiment of FIG. 13, excess water may be removed from the DCU by stream 1015, and returned to the LST 107 for recycling through the system (the water having a different density than the polymer, allowing for removal of the water separate from the liquid polymer).

As in previously described embodiments of the disclosed technology, the polymer is depolymerized in the DCU 101 into a monomer, such as acetaldehyde. In this embodiment, the water also flows through the DCU 101, without any chemical reaction with the polymer, the monomer or the catalyst. However, due to the low pressure effects in the DCU 101 at 3-12 psia, partial evaporation of water (up to 5 wt %) occurs. The evaporation results in a monomer rich vapor mixture that consists of A(g), Pa(g), and water vapor. Under the low pressure effect provided by the blower 104, water, polymer liquid, and the monomer rich vapor streams continuously exit from the bottom of the DCU 101 entering PSU 102 in flow stream 1003.

The PSU 102 and polymerization assembly 200 will operate similarly as described in other embodiments. In the PSU 102, the monomer and water vapor, up to 5 wt %, are separated from the liquid polymer and liquid water and flow to the blower 104 in stream 1005, then pumped to the PHU 201 in stream 1010. Subsequently, water will be in the PHU 201 and streams 1009 and 1013. The small water content will not alter the operations of the components other than inhibiting the side reaction that forms the 2-butenal in the PHU 201.

The polymer rich stream (Pa(l), A(l), and water) exits the PSU 102 in flow stream 1004 to the LST 107. The mixed stream is separated in the LST 107 into the water layer in the bottom and the polymer layer in the top of the tank. The recovered water and polymer rich stream are then pumped to the DCU 101 to repeat the cooling cycle of the disclosed technology.

Figure 10:
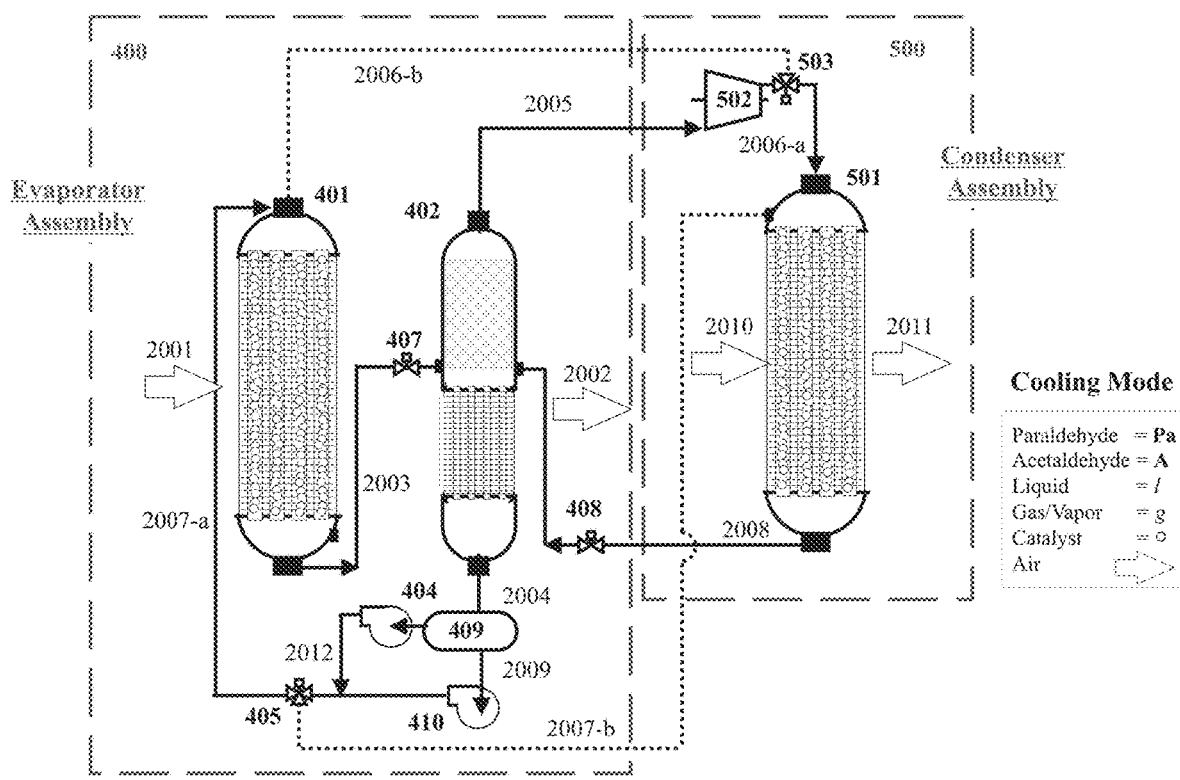
FIG. 10 is a schematic process flow diagram of another embodiment of the apparatus of the disclosed technology, using an uninterrupted heatpump in the cooling cycle.

FIG. 10 shows the application of this incorporation of water into the systems of the disclosed technology as applied to the heatpump embodiment of FIG. 6, operating in a cooling cycle. In this embodiment the system is composed of two main assemblies: Evaporator Assembly 400 and Condenser Assembly 500. Under cooling mode, the heat exchanger 401 functions as a depolymerization cooling unit. The heat exchanger 401 is in liquid communication with a PSU 402, a paraldehyde liquid pump 404, a 3-way valve 405, a water liquid pump 410, and an LST 409. The automatic control valve 407 controls the flow of the depolymerization products directed to the PSU 402 in stream 2003. In this operating mode, the heat exchanger 501 of the condenser assembly 500 operates as the polymerization heating unit, in liquid communication with a 2-way valve 408 and a three-way valve 503. A paraldehyde and water mixture in stream 2007-*a* is introduced into the depolymerization unit 401. The mixture undergoes an endothermic depolymerization and evaporation process, drawing heat from stream 2001 and decreasing its temperature to that of stream at 2002. The water in stream 2007-*a* does not react inside 401, but experiences partial evaporation. Stream 2005 consists of a vapor-liquid mixture, rich in acetaldehyde; its flow from the DCU 401 into the PSU 402 in stream 2003, and its flow rate is controlled by valve 407. The PSU 402 separates the streams 2003 and 2008 (from the PHU) into a vapor stream 2005, rich in acetaldehyde, and a liquid paraldehyde and water stream 2004. As hereinabove described, the LST 409 separates the paraldehyde and water in stream 2004, into a liquid water stream 2009 and a paraldehyde stream 2012. The liquid pumps 404 and 410 control the paraldehyde and water flow rate, respectively. The blower, compressor or vacuum pump 502 generates a pressure difference between the evaporator assembly 400 and the condenser assembly 500, by which the water vapor is condensed into liquid water. The liquid polymer and liquid water also flow to the PSU 402. Furthermore, it facilitates the evaporation of stream 2005 and its flow into PHU 501 where it undergoes a polymerization and condensation process. Heat generated in PHU 501 is dissipated to the system surroundings into stream 2010, resulting in a discharge air stream 2011. The liquid products from the polymerization process in PHU 501 are discharged through stream 2008, its flow rate is controlled by one 2-way expansion valve 408. After undergoing an expansion process, stream 2008 flows into the PSU 402 and undergoes the previously explained separation process.

Figure 11:
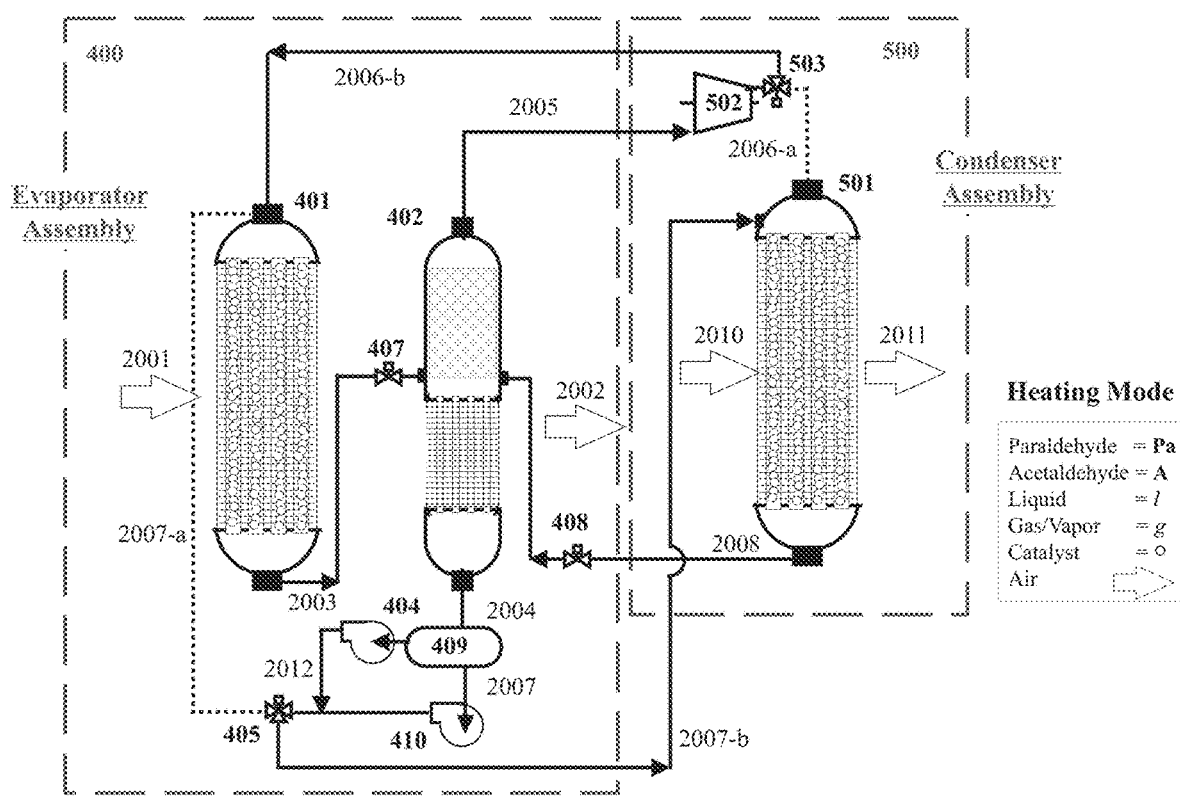
FIG. 11 is a schematic process flow diagram of the embodiment of FIG. 10, in the heating cycle.

FIG. 11 shows the application of this incorporation of water into the systems of the disclosed technology as applied to the heatpump embodiment of FIG. 7, operating in heating mode. As indicated by streams 2006-*b* and 2007-*b*, the flow direction in the system is changed. Under this configuration the heat exchanger 401 functions as the PHU and the heat exchanger 501 as the DCU. The flow direction is modified using two 3-way valves 405 and 503. The liquid paraldehyde and water are rerouted by 405 and co-fed into the DCU 501 in stream 2007-*b*. The heat exchanger 501 draws heat from air stream 2010 decreasing its temperature to that of stream 2011. The depolymerization products exit the DCU 501 in stream 2008 into the PSU 402. The blower, compressor or vacuum-pump 502 draws the vapor rich stream 2005 from the PSU 402. The vapor stream out of the blower, compressor or vacuum-pump 502 is redirected by one 3-way valve 503 into stream 2006-*b* and enters the heat exchanger 401. Polymerization reaction and condensation processes take place in the heat exchanger 401, dissipating heat into stream 2001 and increasing its temperature to that of stream 2002. The dissipated heat is also used in the evaporation process in the PSU 402.

Although not shown, water may be similarly incorporated into the embodiments of the disclosed technology shown in FIGS. 2-4 and 8.

Figure 19:
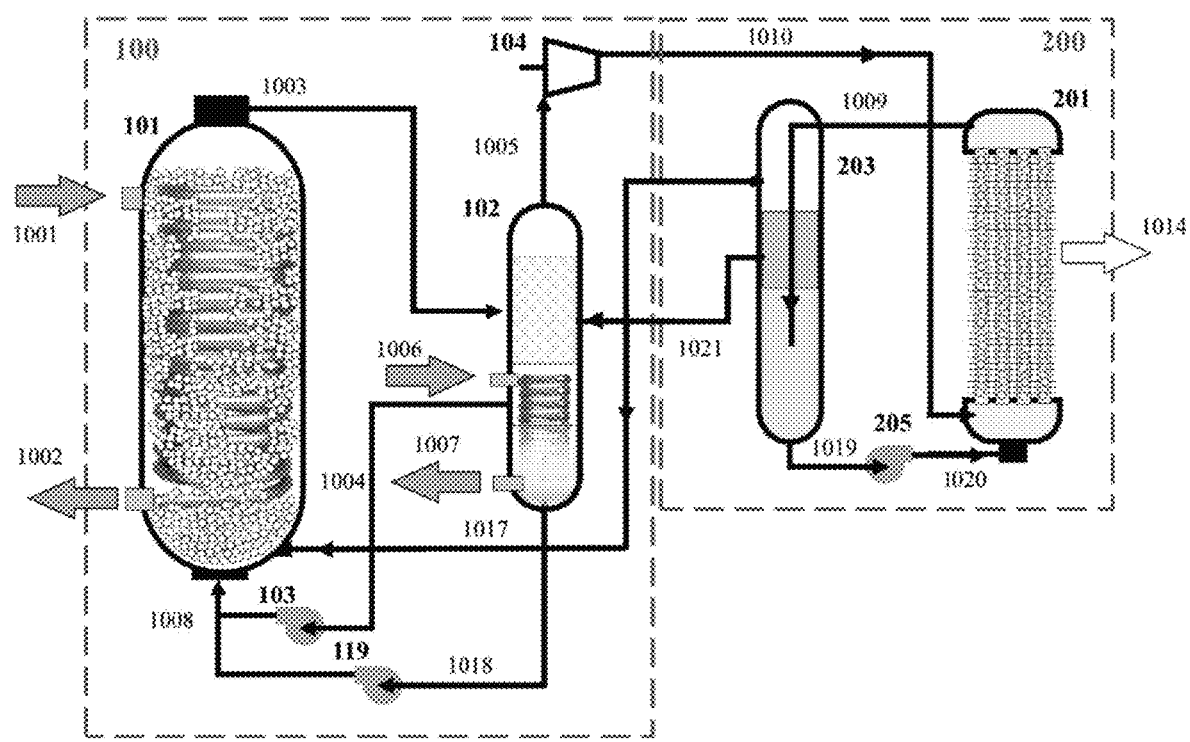
FIG. 19 is a schematic process flow diagram of another embodiment of the apparatus of the disclosed technology, utilizing a liquid catalyst in each of the depolymerization and polymerization processes.
Figure 20:
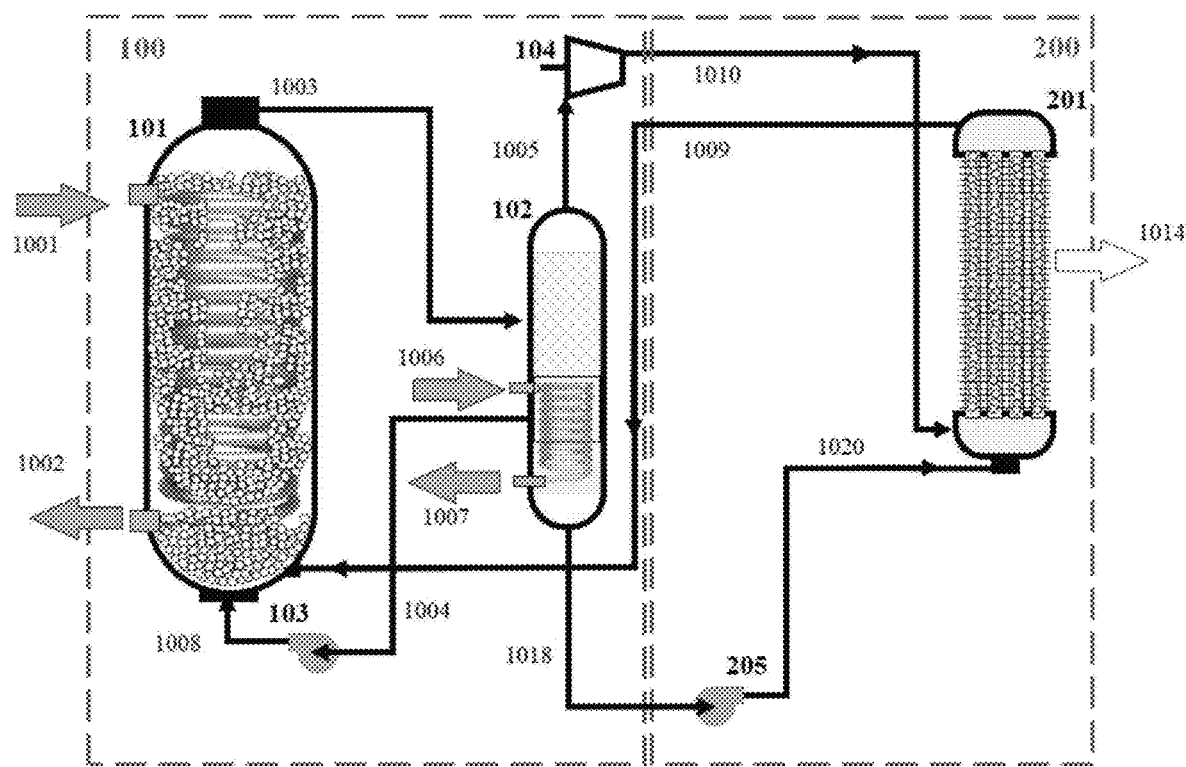
FIG. 20 is a schematic process flow diagram of another embodiment of the apparatus of the disclosed technology, utilizing a liquid catalyst in each of the depolymerization and polymerization processes.
Figure 21:
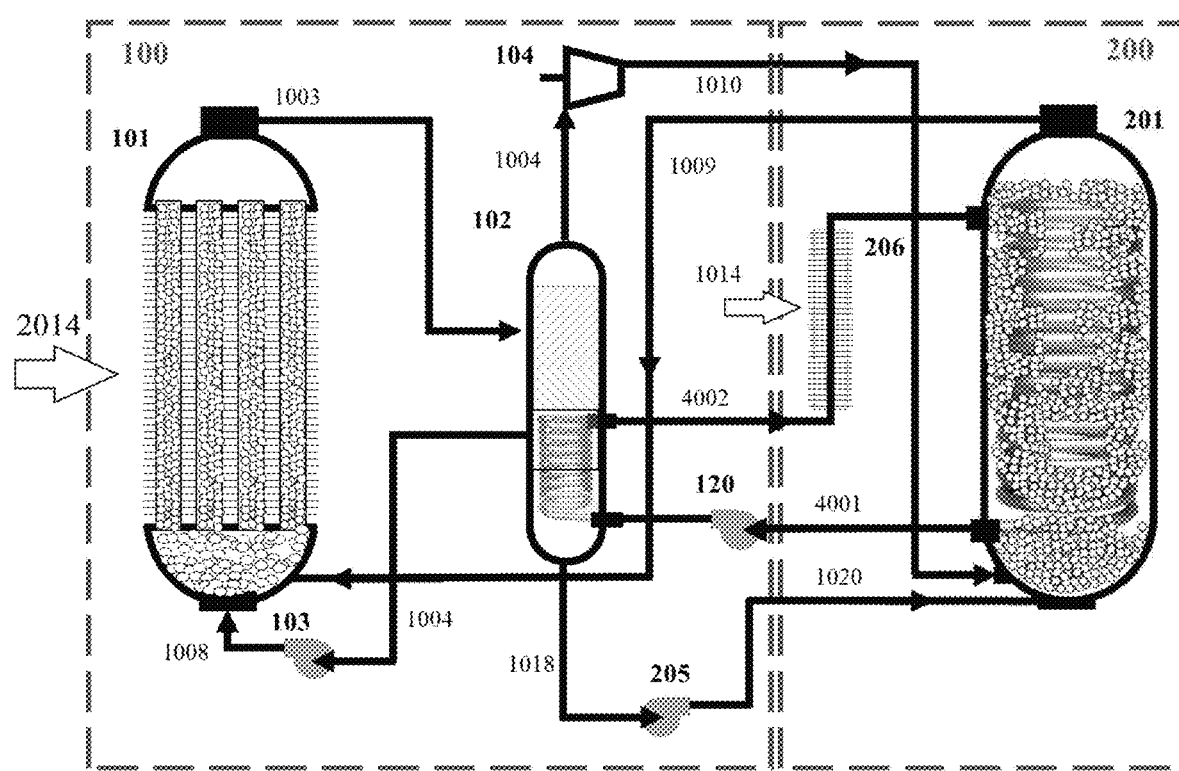
FIG. 21 is a schematic process flow diagram of another embodiment of the apparatus of the disclosed technology, utilizing a liquid catalyst in each of the depolymerization and polymerization processes.

As shown in the schematic process flow diagrams of FIGS. 19-21, in another embodiment a liquid catalyst is used in both the polymerization and depolymerization processes of the disclosed technology. In the exemplary embodiment of FIG. 19, the same liquid catalyst is loaded within the DCU 101 and the PHU 201, and flows through these elements and the PSU 102. During operation of the system, the liquid catalyst will swell; therefore, the volume of catalyst bed in the DCU 101 and the PHU 201 should range from 25% to 75% of their respective unit capacities. In this embodiment, and incorporating technology as hereinabove described, the PSU 102 separates the monomer (by heat converting the monomer to vapor), and the polymer and liquid catalyst mixture (by density) into three separate flow streams, monomer stream 1005, polymer stream 1004 and catalyst stream 1018. The catalyst stream 1018 is then recirculated back to the DCU 101 by means of a catalyst circulation pump 119.

A catalyst separation unit (CSU) 203, such as a liquid-liquid separator, may be incorporated into the polymerization assembly 200 to separate the monomer, the catalyst and the polymer after polymerization in the PHU 201 (wherein the monomer, polymer and catalyst mixture are received from the PHU at stream 1009), and after separation the polymer is then returned to the PSU 102 by means of stream 1021, the monomer is returned to the DCU 101 by means of stream 1007, while the catalyst returns to the PHU 201 by means of streams 1019, 1020 and catalyst circulation pump 205.

In other embodiments of the disclosed technology, as shown for example in FIG. 20, a CSU is not used, and the polymer and catalyst rich mixture is provided to the DCU 101, without separation or return of the catalyst to the PHU 201; in this embodiment, liquid catalyst from the PSU 102 is provided to the PHU 201 rather than the DCU 101, by means of streams 1018, 1020, and catalyst circulation pump 205. Thereby, the catalyst flows through the DCU 101 and PHU 201, rather than being generally isolated within one of the assemblies.

In yet another embodiment of the disclosed technology, in lieu of using source liquid at streams 1006 and 1007 to provide heat to the PSU 102 to facilitate separation of the polymer, the monomer and the catalyst, a higher quality heat may be provided by means of a heat rejection unit (HRU) 206 and liquid loop as shown in the schematic process flow diagram of FIG. 21 (the heat stream provided by the HRU may be 5-25° C. higher than the source liquid stream). In this embodiment, the PHU 201 rejects its heat to a liquid loop 4001, 4002, through the PSU 102, using a pump 120, thereby providing heat to separate the monomer, polymer and catalyst in the PSU. After the heated liquid passes through the PSU 102, it is air cooled in the HRU 206 by means of a forced air stream 1014, and returned to the PHU. Notably, this HRU and the related process of rejecting heat from the PHU through the PSU may be incorporated into any of the embodiments herein disclosed comprising a PSU.

The liquid catalyst useful in these and other embodiments of the disclosed technology may be an aqueous solution of sulfuric acid, nitric acid, or hydrochloric acid with concentration range of 10-50 wt %. When using a liquid catalyst in the systems and methods disclosed in this application, because the liquid catalyst is an aqueous solution, 2-butenal and other undesirable side products/compounds are not formed in the process, and cycling additional water through the system is not necessary.

Using a liquid catalyst in the systems and methods of the disclosed technology yields a higher performance system and process, with less pressure drop, and provides ease of operation, over systems using dry catalysts as hereinabove described. For example, packed bed catalyst systems of the disclosed technology may have an overall heat transfer coefficient of 500 W/m$^2$C, wherein similar systems employing the liquid catalyst significantly increased the overall heat transfer coefficient to more than 800 W/m$^2$C. Further, with the elimination of the packed catalyst bed, pressure drop reduces significantly. In some dry catalyst embodiments (¾" tubular reactor packed with a solid catalyst), the pressure drop was calculated at 1.34 psig: in similar embodiments under similar operating conditions using the liquid catalyst, the calculated pressure drop was 0.9 psig. With this higher heat transfer performance and lower pressure drop, the liquid catalyst systems and processes yield overall higher operating performances.

Figure 12:
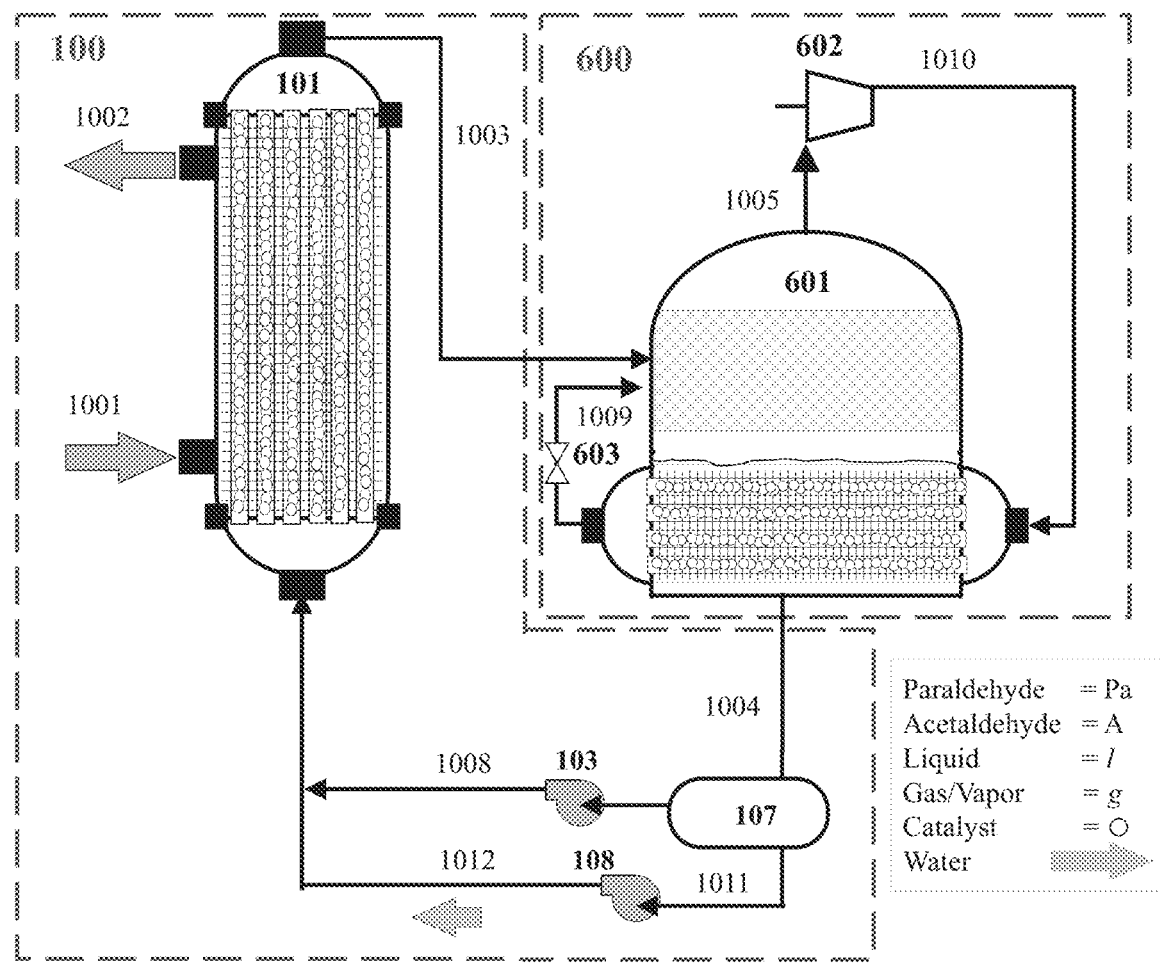
FIG. 12 is a schematic process flow diagram of another embodiment of the apparatus of the disclosed technology, using an uninterrupted cycle and a combining the PHU and PSU into one combined polymerization and separation unit (CPSU).

In another embodiment of the disclosed technology, as shown in the schematic process flow diagram of FIG. 12, an uninterrupted cooling cycle with a single combined polymerization and separation unit (CPSU) 601 is provided. In this embodiment, a single combined polymerization and separation assembly 600 consists of a CPSU 601, a blower 602, and a pressure regulating device 603, such as a valve, an orifice, a pump, or any combination of these devices. The assembly 600 is configured to replace the polymerization assembly 200 and the PSU 102 shown in FIGS. 2-5 and 8-9 with a single unit to polymerize the monomer rich vapor and, using the heat from the polymerization process, to separate the monomer rich vapor from the polymer rich liquid. Although not shown specifically, this single unit polymerization and separation assembly may be used with the cold energy storage assembly and technology as shown in FIGS. 2-4 and herein described.

The configuration of the CPSU 601 provides for both the polymerization of the monomer gas (by means of, for example, a liquid-to-liquid heat exchanger, having a polymerization chamber) and the separation of the monomer rich vapor from the polymer rich gas (by means of, for example, a vapor-liquid separator having a separation chamber). A tube-and-shell evaporator may function as the CPSU in the disclosed technology. In such a configuration, the shell portion of the CPSU is similar to PSU 102 of prior embodiments, functioning as a vapor-liquid separator and separation chamber designed to receive the inlet monomer rich gas mixture from the DCU 1003 and the polymer rich liquid mixture 1009 after polymerization, and separate them into the monomer rich vapor 1005 (greater than 80 wt % monomer, and in some embodiments greater than 90 wt % monomer) and the polymer rich liquid 1004 (greater than 80 wt % polymer liquid, and in some embodiments greater than 90 wt % polymer) under the previously disclosed pressure (3-12 psia) and temperature (26-55° C.) conditions. The bottom of the CPSU 601 has a polymerization chamber designed similar to a liquid-to-liquid heat exchanger, with an acid based catalyst in the tube flow portion of the reactor. In this configuration, the monomer rich vapor 1010 from the shell portion of the CPSU is fed, at an increased pressure of between about 10-25 psia, into the tubes, polymerizing the monomer as it flows in the acid based catalyst. The resulting polymer rich mixture 1009 is returned to the separator/shell portion of the unit, and the remaining monomer is separated from the polymer rich liquid and returned to the polymerization portion of the unit, by means of line 1010. While the process has been described by the example of a tube and shell heat exchanger, other heat exchanger configurations may be suitable for purposes of these reactors of the disclosed technology. In some embodiments, such as where excess monomer generates heat in excess of the heat required for separation, fans or other means to expel the excess heat from the CPSU may be integrated with the system; in other embodiments, where heat generated by the polymerization of the monomer is necessary for the separation process as herein described, then the CPSU may be wrapped in heat insulation, designed as double walled tanks, or may otherwise be insulated to maintain the heat within the CPSU.

In this embodiment of FIG. 12, when operating in a cooling process both the polymer and the water are pumped from the LST 107 to the bottom of the DCU 101, entering the DCU as a combined stream of water and polymer. In this embodiment the polymer is pumped in stream 1008, and the water is pumped in stream 1012, wherein the water pumping rate is controlled at 1-10 wt % of the polymer flow rate to prevent excess accumulation of water in the DCU 101. Similar to FIG. 9, and as in previously described embodiments of the disclosed technology, the polymer, such as paraldehyde, is depolymerized in the DCU 101 into a monomer, such as acetaldehyde, and the water flows through the DCU 101, without any chemical reaction with the polymer, the monomer or the catalyst. The polymer, monomer and water mixture is removed to the separation portion of the CPSU 601 in stream 1003. However, due to the low pressure effects in the CPSU 601 at 3-12 psia, and 4-45° C., partial evaporation of water (up to 5 wt %) occurs. The resulting monomer rich vapor mixture that consists of A(g), Pa(g), and water vapor is removed from the separation portion of the CPSU 601, in stream 1005.

The monomer rich vapor exits from CPSU 601 in stream 1005, similarly as described in other embodiments, and flows into the tube flow portion of the reactor at the bottom of the CPSU 601 under the influence of blower 602. The monomer is polymerized over an acid catalyst to produce a polymer rich liquid (Pa(l)), with less than 100% conversion, under a temperature range of 26-55° C. and pressure ranges from 10 to higher than 14.7 psia. The small amount of water content will not alter the polymerization operation other than inhibiting the side reaction that otherwise forms the 2-butenal during the polymerization process. The heat produced under the polymerization reaction is transferred to the mixtures within the shell side of the CPSU 601, facilitating the separation of monomer vapor from polymer liquid. The polymer rich mixture in flow stream 1009 is returned back to the CPSU 601 shell portion for further separation of remaining monomer gas. Packing (such as metal packing) may be included in the CPSU to facilitate separation of the liquid and the vapor in the shell portion of the CPSU. The pressure differential between the stream 1010 (greater than 10 psia) and stream 1009 (3-12 psia) is regulated by blower 602 in the path of flow streams 1005 and 1010 and by a pressure regulating device 603, similar to the hereinabove described embodiments. The heat transferred from the reaction into the shell side of the CPSU causes the mixture within the shell portion, under the applications' pressure conditions (3-12 psia), to further vaporize the monomer gas from the polymer rich liquid mixture, and recycle it through stream 1005 for re-polymerization. A more concentrated polymer rich liquid stream (>80 wt % polymer, and in some embodiments >90 wt % polymer) and water is then expelled from the CPSU 601 to LST 107, at stream 1004, to facilitate the independent feeding of both water at feed stream 1012 and paraldehyde polymer at feed stream 1008 into the DCU, as described in other embodiments.

In the embodiments shown in FIGS. 2-13, the DCU 101 can be configured to increase the flow rate of feed stream 1008 significantly so the reaction is limited by reaction equilibrium with little monomer vaporization. Under the applications' pressure (3-12 psia) and temperature (4-45° C.) conditions, but with a faster flow rate, polymer will be depolymerized to a liquid mixture of polymer and monomer with or without water (in some embodiments, this mixture may be around 80 wt % polymer). The overall polymer conversion in terms of kg monomer produced per kg polymer feed will be lower due to lack of monomer vaporization in the DCU, however, the overall cooling rate can be maintained because more polymer can be pumped into the DCU 101 to compensate for the low polymer to monomer conversion rate. The liquid polymer-monomer mixture stream 1003 then flows to the PSU 102 or CPSU 601 to continue the separation process, wherein a portion of the monomer will vaporize under the conditions of the PSU/CPSU, as herein described for other embodiments, and will separate from the liquid mixture, which vapor portion will be re-polymerized in the PHU 201 or 501, or the CPSU 601, as herein described. Unvaporized monomer in the liquid mixture is recycled through the LST or PST and to the DCU.

The flow rate in these embodiments will vary based upon the application (amount of cooling needed); preliminary testing and estimations showed a heat flow rate of 0.7 kW per 1 liter/minute polymer flow rate at a DCU cooling temperature of 8° C., based upon a reaction heat of 110 kJ/mol or 833 kJ/kg, wherein the polymer is paraldehyde. The density of paraldehyde is 1 kg/liter, and the estimated polymer-monomer conversion in these calculations is 5%.

The potential impact of the dry-cooling system of the disclosed technology for cooling power plant condenser cooling water is the performance penalty imposed by air cooling when ambient temperatures are high. The performance penalty is the result of higher temperature cooling water returning to the condenser, raising condenser saturation pressure and lowering turbine output. In contrast, wet cooling allows cooling systems to operate at wet bulb temperature levels. Under similar condition, the wet bulb temperature is lower than the dry bulb temperature, by an average of 3-5° C. As a result of this fundamental thermodynamic limitation, the use of prior art dry cooling systems result in an average of 2% loss of power output from the steam turbine compared to wet cooling operation, and up to 10% reduced power production under high ambient temperature conditions.

The systems and methods of the disclosed technology eliminate the power production loss (performance penalty) due to high ambient temperatures present in traditional dry cooling technology. Further, the disclosed technology is a closed system, with zero water dissipation to the atmosphere, while providing cooling below ambient dry bulb temperature. The disclosed technology thereby provides a transformational and disruptive development compared to the traditional cold storage technologies, such as ice storage and room temperature phase change materials (PCMs). The system of the disclosed technology, with its practical 1,363 kJ/kg heat storage capacity, has 4 times the heat storage capacity of ice and 7 times the capacity of PCM systems, and uses significantly less energy than comparable technologies (see Table 2). These qualities lead to a smaller and cost effective cooling system.

TABLE 2

Comparison of Heat Capacity and Energy Use

| | Phase Change Material | | | | |
|---|---|---|---|---|---|
| | PureTemp (Entropy Solutions) | Paraffin | Salt Hydrates | Ice Storage | Disclosed Technology |
| Source | Vegetable | Petroleum | Minerals | Water | Polymer |
| Average Heat Storage, kJ/kg | 170-270 | 130-170 | 140-170 | 334 | up to 1,330 |
| Energy Use in kWh/kWh Stored | n/a | n/a | n/a | ~1.3 | ~0.04 |

With prior art technology, the dry bulb ambient air temperature and the second law of thermodynamics set the lower limit of the steam condensation temperature within an air-cooled condenser. High ambient temperature excursions penalize power plant power output performance. The systems of the disclosed technology provides an innovative solution to cool below ambient dry bulb temperature limit and address temperature excursions. The novel approach of combining depolymerization and re-polymerization to create a cycle that pumps heat from a power plant cooling system to the atmosphere effectively eliminates extensive water use and lowers the amount of energy required to provide cooling water for efficient turbine energy production. Likewise, certain reversible chemical reactions which produce endothermic and exothermic reactions within the condenser and ambient temperature ranges may be used in lieu of the depolymerization and polymerization reactions hereinabove described. When standalone or combined with current dry cooling technology (with other technology operating at ambient temperatures within 5° C. higher than the power plant design point), the system of the disclosed technology has the potential to make thermoelectric power plants independent from the nation's water supply infrastructure, operate with high efficiency, and conserve significant water resources for use in the agricultural, municipal, and industrial sectors.

The system of the disclosed technology can also serve other industrial cooling applications such as cooling for gas turbine inlet air cooling, lube oil cooling, steam cracker cooling for polymer production, and intercooling loop for large industrial compressors, as well as other applications as hereinabove described. For gas turbine inlet air cooling, for example, the DCU would be an air to liquid heat exchanger, with the inlet air being directed across the DCU for cooling.

Furthermore, the system and methods of the disclosed technology may be coupled with the thermal management system (TMS) for directed energy systems such as high energy lasers (HELs). As hereinabove discussed, coolant flow rate range and temperature range in the TMS may be designed to ensure the temperature of the pump diodes and other HEL components are maintained close to the optimal temperature, enabling the HEL to operate continuously. The disclosed technology cycle, systems and methods, and the embodiments and configurations herein described, can be used to provide highly efficient cooling to this coolant, ensuring it returns to the directed energy components within the designed temperature and flow rate ranges of the HEL.

Figure 14:
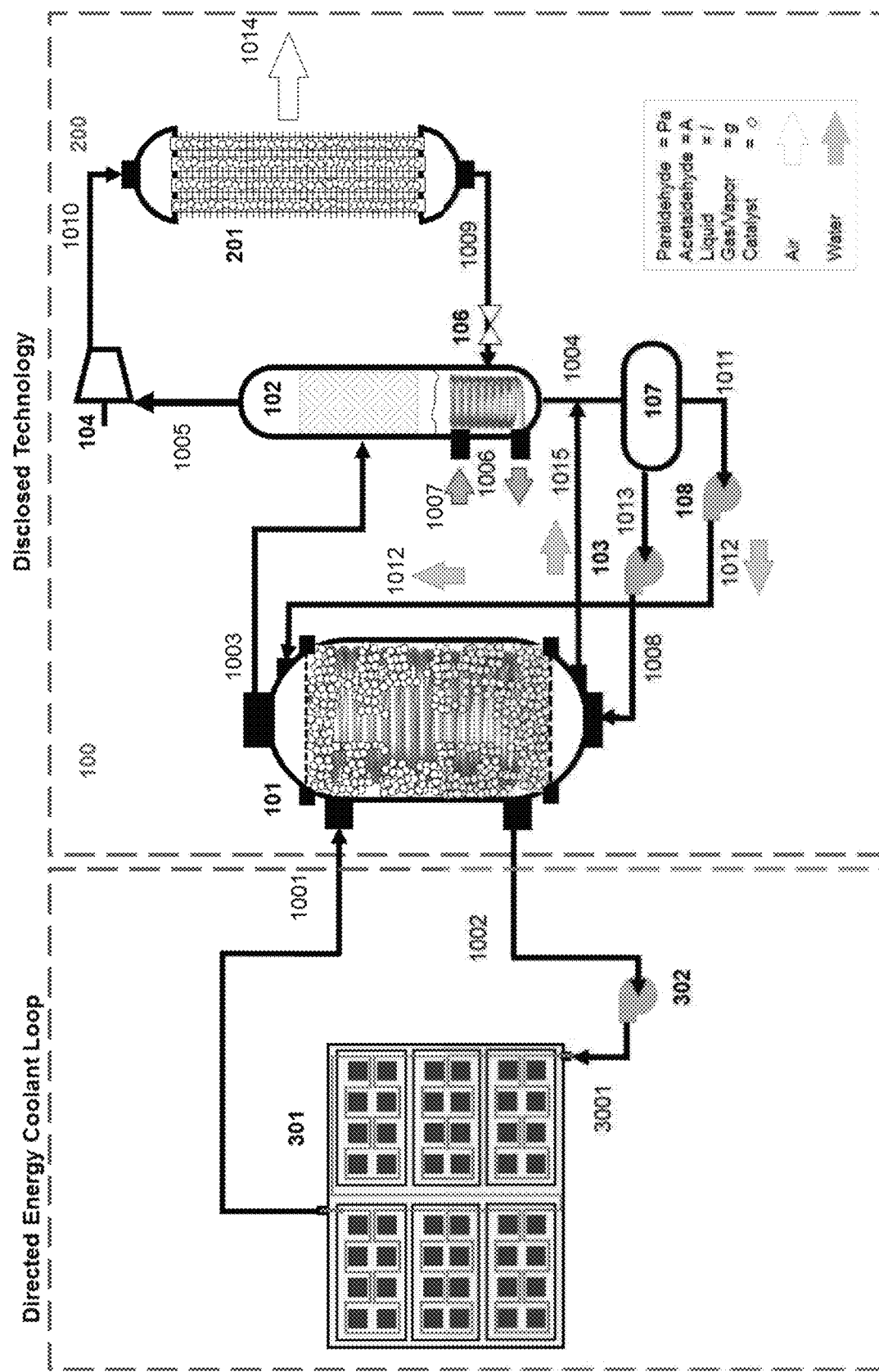
FIG. 14 is a schematic process flow diagram of another embodiment of the apparatus of the disclosed technology, wherein an embodiment of the disclosed technology is integrated into a directed energy system to provide cooling to directed energy components.

As shown in the embodiment of FIG. 14, a dry-cooling module useful in absorbing heat from coolant in a directed energy system is provided. As with the other embodiments of the disclosed technology herein described, in this embodiment the module a depolymerization assembly 100 including a DCU 101, in fluid communication with a polymerization assembly 200, including a PHU 201. The DCU has an acid based catalyst disposed within a heat exchanger, and receives streams of polymer at line 1008 and water at line 1012, and further provides for the TMS coolant to cycle through the DCU at lines 1001, 1002. As in other embodiments, contact of the polymer (e.g., paraldehyde) over the catalyst within the DCU converts the polymer into a monomer (liquid or gas, as hereinabove described) in an endothermic reaction. This endothermic reaction draws heat from the coolant cycling through the DCU. A stream of monomer is withdrawn from the DCU at line 1003 and provided to the PHU at line 1010 for re-polymerization. A blower 104 may be incorporated into the system in fluid communication with the DCU and the PHU to withdraw the monomer from the DCU, and convey the monomer to the PHU. In some configurations, as hereinabove described, the monomer resulting from the contact of the polymer over the first catalyst within the DCU is primarily a gas; in other configurations the monomer resulting from the contact of the polymer over the first catalyst is primarily a liquid.

The PHU 201 of the present embodiment also comprises a heat exchanger, wherein a second acid based catalyst is disposed within the PHU and the PHU receives the monomer at line 1010. As hereinabove described, the first acid based catalyst and the second acid based catalyst may be the same catalyst. Flow of the monomer over the second acid based catalyst converts the monomer to the polymer in an exothermic reaction, and the PHU expels a stream of the polymer at line 1009 for conveyance to the DCU. Heat is expelled at 1014 from the PHU to the ambient environment at a heat transfer surface. In some embodiments the PHU heat exchanger consists of multiple finned tubes, with ambient air being blown across the surface of the finned tubes. The fins on the tube increase heat transfer surface area and allow efficient heat rejection from the PHU to the atmosphere. A fan can be configured to either blow or pull air across the PHU for efficient heat removal at 1014.

A PSU 102 may be incorporated into the system, in fluid communication between the DCU and the PHU. The PSU may include a PSU heat exchanger and a heat source, wherein the PSU receives from the DCU the stream of monomer at line 1003, which stream may also include a portion of the polymer. Heat is transferred from the heat source to the stream of monomer to further separate the monomer and the polymer, and the PSU expels the monomer to the PHU at line 1005. The coolant from the HPE may also cycle through the PSU at lines 1006, 1007 as the heat source of the PSU. The PSU may further receive from the PHU the stream of polymer at line 1009, which stream may also include a portion of the monomer, and expels the polymer for conveyance to the DCU at line 1004. A pressure regulating valve 106 is used to control the amount of mixture from PHU 201 to PSU 102 so that the pressure difference between the two units is properly maintained at the ranges described hereinabove.

In some embodiments as hereinabove described and depicted in other figures (e.g., FIG. 8), a second PSU may be incorporated into the system in fluid communication between the PHU and the DCU. The stream of polymer (which may also include a portion of the monomer) may be directed to the second PSU instead of the first PSU, and the coolant may also cycle through the second PSU allowing heat from the coolant to be transferred to the stream of the polymer liquid and the monomer liquid, to further separate the polymer from the monomer. The second PSU may then expel the polymer for conveyance back to the DCU and the monomer back to the PHU.

The PSU and PHU may also be configured to facilitate heat transfer from the PHU to the PSU as herein described and shown in other figures (e.g., FIG. 12), wherein the flow of the monomer over the second acid based catalyst in the exothermic reaction in the PHU is the heat source of the PSU. In this configuration, the PHU may be positioned within the PSU. In some embodiments, the PHU may include one or more tubes, the PSU may include a shell, and the tubes of the PHU may extend through an interior of the shell of the PSU.

As shown in FIG. 14, water may be cycled through the module. In this configuration, the DCU is configured to receive water at line 1012, and the endothermic reaction of the contact of the polymer over the catalyst within the DCU causes at least a portion of the water to vaporize into water vapor, and the DCU expels the water vapor with the monomer to the PHU. The exothermic reaction of the contact of the monomer over the catalyst within the PHU is unaffected by the presence of water, other than inhibiting the side reaction that otherwise forms the 2-butenal, and the PHU expels the water with the polymer for conveyance back to the DCU at line 1009. In this configuration, the system may also include an LST 107 in fluid communication between the PHU and the DCU, to separate the polymer from the water, and independently convey the polymer and the water to the DCU at lines 1013, 1008 and 1011, 1012, respectively. Further, excess water may be removed from the DCU by stream 1015, and returned to the LST 107 for recycling through the system (the water having a different density than the polymer, allowing for removal of the water separate from the liquid polymer). As in certain other embodiments, the coolant may cycle through the PSU 102 positioned in fluid communication between the DCU and the PHU. In this configuration the PSU receives from the DCU the monomer and water vapor (which stream also comprises a portion of the polymer) at line 1003, and a stream of polymer and water (and a portion of the monomer) from the PHU at line 1009, and heat from the coolant cycling through the PSU is transferred to the monomer, water vapor and polymer received by the PSU to further separate the monomer from the polymer. The PSU then expels the monomer to the PHU at line 1005 and the polymer and water for conveyance to the DCU at line 1004.

By these and similar configurations and as hereinabove described and depicted in the embodiment of FIG. 14, the system and methods of the disclosed technology can cycle the HEL TMS coolant through the DCU 101 (by means of lines 1001, 1002) and the PSU 102 (by means of lines 1006, 1007), the module absorbing heat from the coolant in the DCU and the PSU before it is cycled back through the directed energy system.

A plurality of pumps are configured throughout the module to control the cycle and enthalpy change of the coolant as it cycles through the module, as well as the energy drain of the module on the system. Specifically, the polymer feed pump 103, the water co-feed pump 108, the blower 104 and the coolant pump 302 which cycle the polymer/monomer and the coolant through the system of the disclosed technology may have an adjustable volumetric flow rate to control and optimize the coolant enthalpy change and the energy drain of the components on the system. The operation of these control components may be controlled either manually by an operator, or automatically by a programmable logic controller (PLC), or both, based upon a volumetric flow rate signal received by the component. Further, a Proportional, Integral, Derivative (PID) control may be integrated with the system to monitor and control any or all of these components. Adjustment of the operation of these components allows the coefficient of performance (COP) of the system to be maximized, for example, while maintaining the coolant temperature and flow rate in the range specified for the directed energy components.

For example, increasing the speed of the polymer pump 103 increases the liquid polymer flow rate in stream 1008 into the DCU 101, the conversion rate of polymer to monomer within the DCU 101, and the net cooling the disclosed technology cycle provides to the entering coolant in stream 1001, resulting in the coolant exiting at a lower temperature in stream 1002. With the increased liquid polymer flow, the blower 104 output should also be increased, decreasing the pressure in the DCU 101, and thereby increases the conversion percentage of polymer to monomer within the DCU 101. All of these increases in the polymer flowrate and the blower 104 output will require increase in the flowrate of stream 1015. Similarly, increasing the coolant pump 302 speed increases the exiting coolant flow rate in stream 3001 and the net cooling transferred from the disclosed technology cycle to the directed energy components 301. At a certain threshold, the coolant pump's ability to transfer cooling to the directed energy components may be limited by the output of the DCU 101. This increased speed of the pumps 103 and 302, and draw of the blower 104 also increases the electrical draw of the components, and results in a decrease in the system's COP. Further, the speed of the co-feed pump 108 may be controlled such that the water introduced to DCU 101 in stream 1012 is a fixed percentage by volume of the liquid polymer feed to the DCU 1008, or it may be controlled as a variable percentage. Therefore, optimizing the speed/draw of these components to provide sufficient cooling to the coolant with as little energy as possible is desirable to maintain continuous operation of the HEL.

Manual or automatic control of the pumps, blower, and stream 1014 may optimize the cooling capacity to provide effective cooling to the coolant when needed, and will thereby impact the COP. Increasing the system cycle cooling capacity beyond design point will certainly reduce the COP. In this case, increasing system cycle cooling capacity is done by increasing power to system cycle components (103, 108, 104) to increase the flowrate in streams 1008 and 1012 allowing increased depolymerization, and the flowrate in stream 1010 allowing for increased vaporization of the monomer. The polymerization of the increased monomer flowrate requires increased flowrate of stream 1014. To meet the new cooling demand, power to coolant pump 302 will increase. The increase in system cooling capacity will be done by increase in electric draw of the system cycle. Because increasing system cooling capacity is always less than the energy spent in increasing system cycle electric draw, system cycle COP will decrease.

While manual input or system-specific design may control the speed and functionality of the module control components and the TMS coolant pump, using a PLC and PID in the control system would allow the system to automatically calculate and/or control the pump cycle and coolant pump to optimize COP within the system's parameters. This control system may include an optimization algorithm tailored to the specific directed energy equipment and the cycle components.

Figure 15:
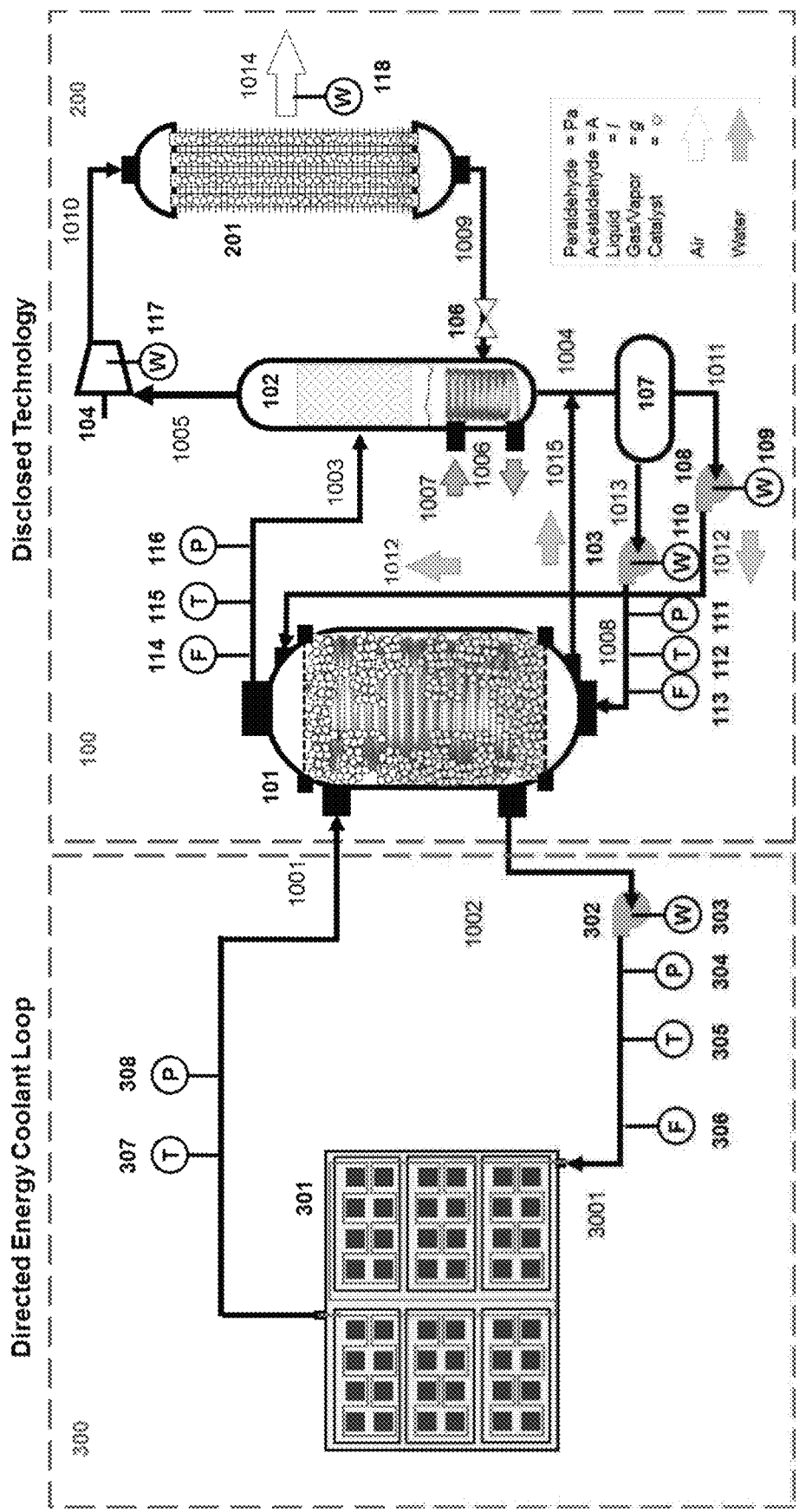
FIG. 15 is a schematic process flow diagram of another embodiment of the apparatus of the disclosed technology of FIG. 14.

To facilitate this optimization, various sensors may communicate operating conditions to the control system. For example, as shown in FIG. 15, temperature sensors such as thermocouples 305, 307, pressure sensors 304, 308, and flow meter 306, may be inserted into the coolant streams 3001 entering and 1001 exiting the directed energy components, as well as thermocouples 112, 115, pressure sensors 111, 116, and flow meters 113, 114 in the dry cooling module liquid polymer line 1008 entering the DCU and the monomer line 1003 exiting the DCU. Measurements from these sensors may be communicated to the control system and enable the heat transfer rate of the system to be calculated so that adjustments may be made to the cycle control components and the coolant pump to achieve optimal performance. For the same purpose, power transducers or amperage sensors 110, 109, 117, 118, 303, may be installed on cycle components (103, 108, 104), stream 1014 and the coolant pump 302 to measure and communicate to the control system component power use. This current data of all measured power use coupled with the calculated heat removed may then be used to calculate the COP of the HEL cooling system, over a period of time, as follows:

$$COP = \frac{\text{Total Heat Removed from 301}}{\text{Total Electric Energy Used}}$$

If available, the control system may also receive signals representing measured directed energy conversion efficiency or beam strength of the HEL as additional optimization parameters. In this case, the impact of the disclosed technology cycle components (and the coolant pump on these parameters) can be considered on the overall operation of the HEL. Since the directed energy components usually consume significantly more energy than the associated cooling system, the control system may be programmed to seek to maintain less than optimal operation of the dry cooling module cycle components and coolant pump to gain optimal efficiency for the directed energy components. Such an approach may result in more effective total electricity use and possibly decrease the time on target required by the directed energy system.

The control system can be used to operate the dry cooling cycle of the disclosed technology, monitor performance, and enable the user to increase or decrease the cooling output by adjusting operation of process equipment and control valves.

Figure 16:
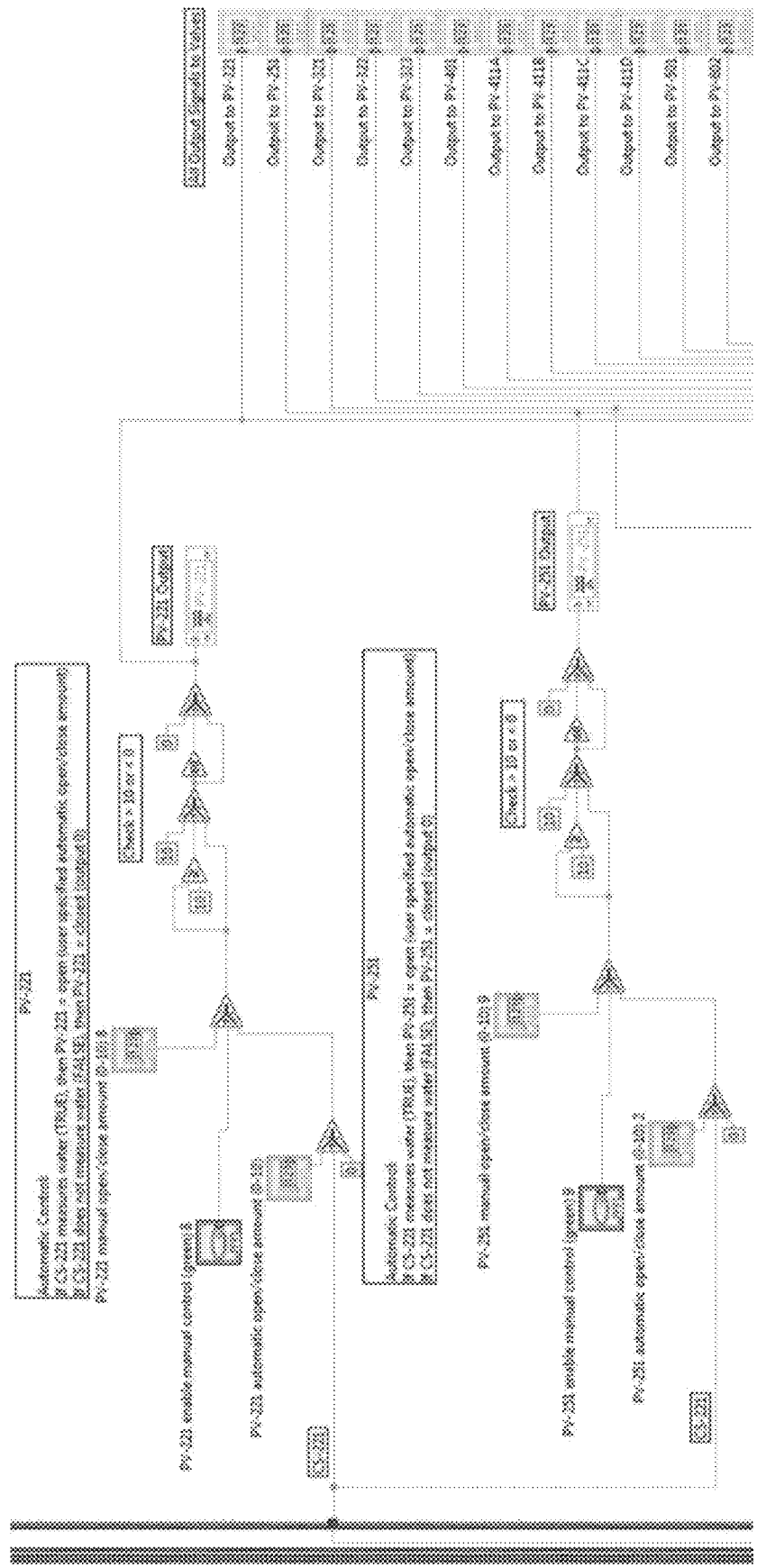
FIG. 16 is a block diagram for controlling operation of the apparatus of the disclosed technology.
Figure 17:
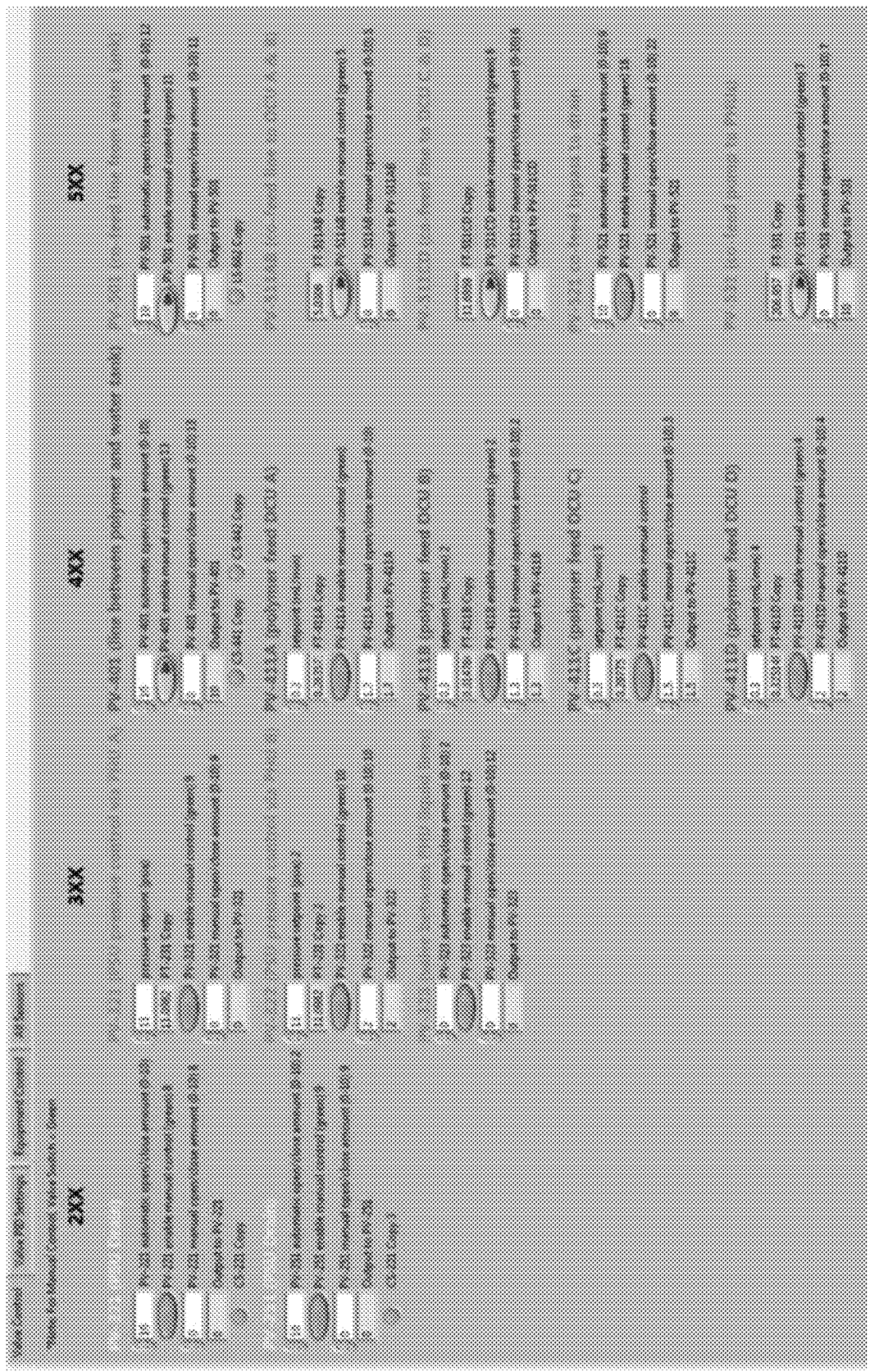
FIG. 17 is an exemplary embodiment of a user interface useful in controlling the apparatus of the disclosed technology.
Figure 18:
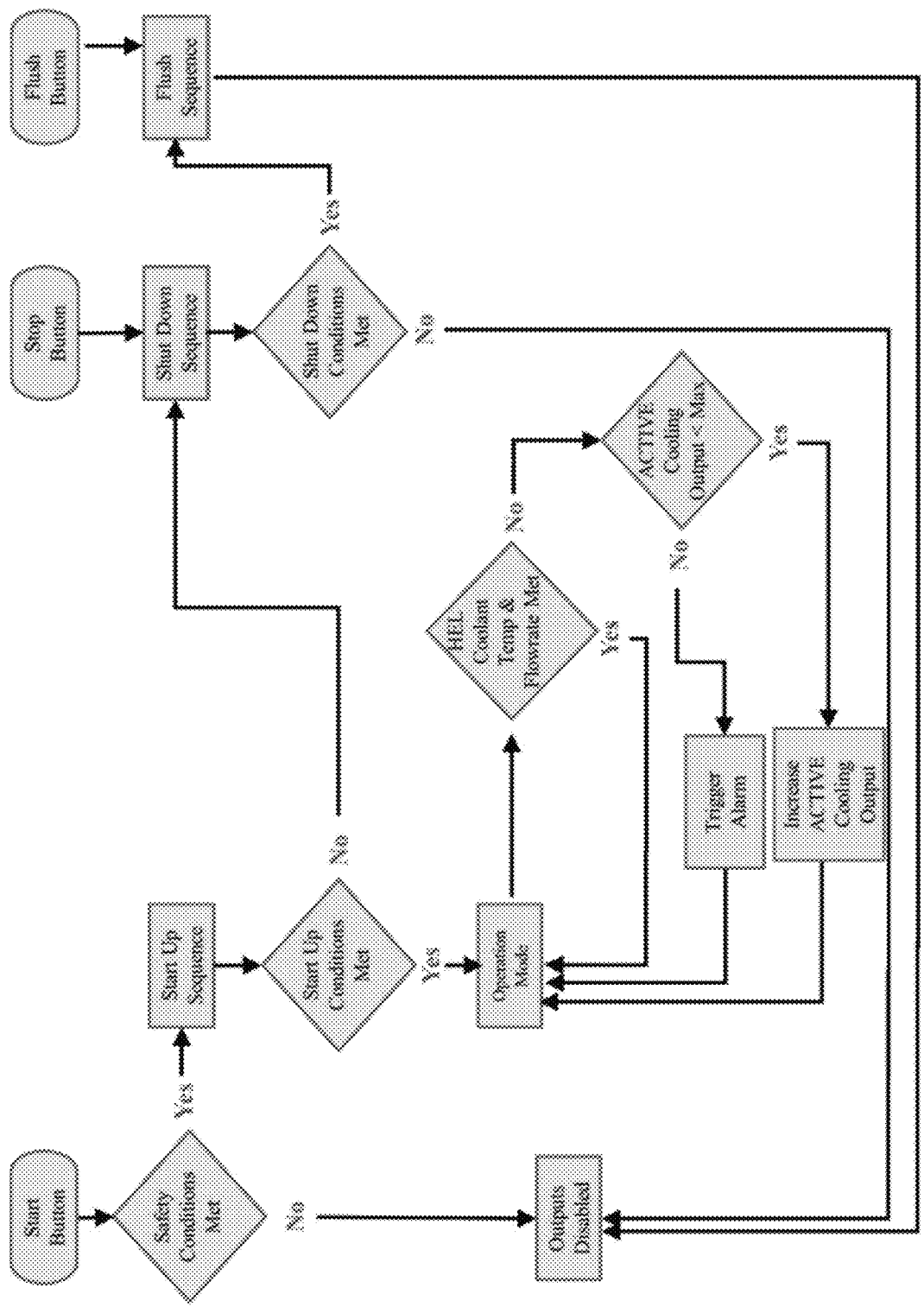
FIG. 18 is a flowchart of an embodiment of controlling the apparatus of the disclosed technology.

In operation, as shown in FIGS. 16-18, a PLC-based control system with a user interface is coupled with any or all of the polymer pump 103, the water pump 108, the blower 104, and any fan or other component of the dry cooling module, as well as the directed energy system's coolant pump 302, each of which may have an adjustable output, such as controlled by a variable frequency drive, adjusting the components output as specified by an input signal from the control system. The input signal may be a 0-10 VDC (or 4-20 mA) control signal provided by a microcontroller, data acquisition hardware, or custom circuitry. National Instruments hardware and LabView software, for example, can be used to construct a PLC-based control system useful in the disclosed technology. FIG. 16 shows a section of a LabView block diagram, which enables a user to control two proportionating valves in the dry cooling cycle. The block diagram enables automatic control over these valves, opening or closing them using a 0-10 VDC (or 4-20 mA) signal in response to a sensor. The block diagram also includes a manual override where the user can force the valve into a certain position, and finally safeties are included to restrict the output to the valve to stay within the 0-10 VDC (or 4-20 mA) range to protect the valve in case of user error. This type of control can be extended to the polymer pump, water pump, blower, and any fan or other component with variable output in the dry cooling module.

The user interface, such as shown in FIG. 17 and generated in LabView, may display information to the user, such as: valve controls and PID settings, process equipment control and PID settings, and sensor measurements. For example, FIG. 17 shows sensor measurements from the dry cooling cycle including: key temperatures throughout the system, water and polymer flow rates obtained by flow transmitters, pressures in the DCU, PSU, and PHU obtained by pressure transducers, float level switches to determine the fill level of the DCU and storage tanks, wet/dry sensors to detect the presence of co-feed or polymer in the PSU and PHU, conductivity switches to discern between water and polymer in the DCU, PSU, and storage tank, and power measurements obtained by power transducers for the fan, blower, and total system power. These sensors provide an informed user with the operating state of the dry cooling cycle. Then, through the Equipment Control tab in FIG. 17, the user can instruct LabView to adjust the input signals to the previously described process equipment. Control of the dry cooling system operation may also include alarms and other configurations, such as shown in FIG. 18.

Using the afore-referenced technology, a method for a dry-cooling cycle useful in absorbing heat from coolant in a directed energy system is also provided. In this method, in a first heat exchanger through which the coolant flows, a polymer is depolymerized in an endothermic reaction, thereby drawing heat from the coolant and producing a monomer; the monomer is withdrawn from the first heat exchanger. A second heat exchanger then polymerizes the monomer, producing the polymer, and the polymer is delivered back to the first heat exchanger. In this method, a third heat exchanger may be provided to receive the monomer from the first heat exchanger and the polymer from the second heat exchanger, and the monomer and the polymer may be further separated, using, for example, the coolant as a heat source, and once separated the polymer is discharged to the first heat exchanger and the monomer is discharged to the second heat exchanger. In some embodiments, water may be cycled through the first and second heat exchangers with the polymer and monomer, respectively.

The method may include adjusting the speed of any number of pumps in the system to optimize the amount of heat withdrawn from the coolant or the COP of the system, as hereinabove described, which adjustment may be manual or automatic, based upon pre-determined target values and current operating conditions as sensed throughout the system.

The invention claimed is:

1. A dry-cooling system useful in absorbing heat from a heat source, the system comprising a depolymerization cooling unit (DCU) in fluid communication with a polymerization heating unit (PHU), wherein:

the DCU comprises a DCU heat exchanger, wherein the DCU heat exchanger receives a polymer and a catalyst, wherein contact of the polymer and the catalyst within the DCU heat exchanger causes an endothermic reaction, converting the polymer to a monomer and drawing heat from a first heat source, and wherein the monomer is withdrawn from the DCU heat exchanger; and the PHU comprises a PHU heat exchanger, wherein the PHU heat exchanger receives the monomer, wherein contact of the monomer with the catalyst causes an exothermic reaction, converting the monomer to the polymer, and wherein the polymer is withdrawn from the PHU for conveyance to the DCU.

2. The dry-cooling system of claim 1, wherein the polymer is paraldehyde.

3. The dry-cooling system of claim 1, wherein the system further comprises a polymer separation unit (PSU) in fluid communication between the DCU and the PHU, wherein the PSU comprises a PSU heat exchanger, wherein the PSU heat exchanger receives from the DCU the monomer and the polymer, and wherein heat from a second heat source is transferred to the PSU heat exchanger, to separate the monomer and the polymer, and wherein the monomer is withdrawn from the PSU and delivered to the PHU, and the polymer is withdrawn from the PSU and delivered to the DCU.

4. The dry-cooling system of claim 3, wherein the second heat source comprises a heat rejection unit (HRU) and a closed loop through which a liquid cycles, the closed loop traversing the PHU, the PSU and the HRU, wherein the liquid receives heat in the PHU, transfers heat to the monomer and the polymer in the PSU, rejects heat in the HRU, and returns to the PHU.

5. The dry-cooling system of claim 1, wherein the catalyst is a liquid catalyst.

6. The dry-cooling system of claim 5, wherein the liquid catalyst is an aqueous solution of sulfuric acid, nitric acid, or hydrochloric acid, with a concentration range of 10-50 wt%.

7. The dry-cooling system of claim 5, wherein at least a portion of the catalyst is withdrawn from the DCU with the monomer, and at least a portion of the catalyst is withdrawn from the PHU with the polymer.

8. The dry-cooling system of claim 7, wherein the catalyst is a liquid catalyst, the PSU heat exchanger further receives from the DCU or the PHU, or both, the catalyst, and wherein the catalyst is separated from the monomer and the polymer in the PSU.

9. The dry-cooling system of claim 8, wherein the system further comprises a catalyst separation unit (CSU) in fluid communication with the PHU, PSU and the DCU, wherein the CSU comprises a CSU liquid-liquid separator to separate the catalyst, the polymer and the monomer received from the PHU, and wherein the polymer is withdrawn from the CSU and delivered to the PSU, the monomer is withdrawn from the CSU and delivered to the DCU and the catalyst is withdrawn from the CSU and delivered to the PHU.

10. The dry-cooling system of claim 8, wherein the catalyst is withdrawn from the PSU and delivered to the PHU; and wherein the catalyst and the polymer are withdrawn from the PHU for conveyance to the DCU.

11. A method of dry-cooling useful in absorbing heat from a heat source, the method comprising the steps of:

providing a polymer, a catalyst, and a first heat source;

in a first heat exchanger, by contact of the polymer and the catalyst, converting the polymer to a monomer in an endothermic reaction, the endothermic reaction drawing heat from the first heat source;

withdrawing the monomer from the first heat exchanger;

in a second heat exchanger in fluid communication with the first heat exchanger, receiving the monomer and by contact of the monomer with the catalyst converting the monomer to the polymer; and discharging the polymer from the second heat exchanger back to the first heat exchanger.

12. The method of dry cooling of claim 11, further comprising the steps of:

in a third heat exchanger, receiving the monomer, the polymer and the catalyst from the first heat exchanger, and further separating the monomer, the polymer, and the catalyst using heat from a second heat source;

discharging from the third heat exchanger the polymer to the first heat exchanger; and discharging from the third heat exchanger the monomer to the second heat exchanger.

13. The method of dry cooling of claim 12, further comprising the step of:

in a liquid-liquid separator, receiving the polymer, the monomer and the catalyst from the second heat exchanger, separating the polymer, the monomer and the catalyst, and discharging from the liquid-liquid separator the polymer to the third heat exchanger, the monomer to the first heat exchanger, and the catalyst to the second heat exchanger.

14. The method of dry cooling of claim 13, wherein the second heat source comprises a liquid-air heat exchanger in a closed loop through which a liquid cycles, the closed loop traversing the second heat exchanger, the third heat exchanger and the liquid-air heat exchanger, wherein the liquid receives heat in the second heat exchanger, transfers heat to the third heat exchanger, rejects heat in the liquid-air heat exchanger, and returns to the second heat exchanger.

15. The method of dry cooling of claim 12, wherein the catalyst is a liquid catalyst.

16. The method of dry cooling of claim 15, wherein at least a portion of the catalyst is discharged from the first heat exchanger with the monomer, and at least a portion of the catalyst is discharged from the second heat exchanger with the polymer.

17. The method of dry cooling of claim 15, wherein the liquid catalyst is an aqueous solution of sulfuric acid, nitric acid, or hydrochloric acid.

18. A method for cooling a heat source, the method comprising:

in a first heat exchanger, depolymerizing a polymer in an endothermic reaction, drawing heat from a heat source and producing a monomer;

withdrawing the monomer from the first heat exchanger;

in a second heat exchanger, polymerizing the monomer, producing the polymer; and delivering the polymer back to the first heat exchanger.

19. The method for cooling a heat source of claim 18, wherein the polymer is depolymerized by contact with a liquid catalyst.

20. The method for cooling a heat source of claim 19, wherein the liquid catalyst is an aqueous solution of sulfuric acid, nitric acid, or hydrochloric acid.

21. The method for cooling a heat source of claim 19, further comprising the steps of:

in a third heat exchanger, separating the monomer, the polymer and the catalyst received from the first heat exchanger using heat from a second heat source, discharging from the third heat exchanger the polymer and the catalyst to the first heat exchanger, and discharging from the third heat exchanger the monomer to the second heat exchanger; and in a liquid-liquid separator, receiving the polymer, the monomer and the catalyst from the second heat exchanger, separating the polymer, the monomer and the catalyst, and discharging from the liquid-liquid separator the polymer to the third heat exchanger, the monomer to the first heat exchanger, and the catalyst to the second heat exchanger.

\* \* \* \* \*

UNITED STATES PATENT AND TRADEMARK OFFICE
CERTIFICATE OF CORRECTION

PATENT NO. : 10,752,821 B2  
APPLICATION NO. : 16/422124  
DATED : August 25, 2020  
INVENTOR(S) : Aly H. Shaaban, Gong Zhou and Joshua J Mormile Page 1 of 1

It is certified that error appears in the above-identified patent and that said Letters Patent is hereby corrected as shown below:

In the Specification

On Column 1, Line 5, before the "BACKGROUND OF THE DISCLOSED TECHNOLOGY," please insert the following paragraph:
-- STATEMENT OF GOVERNMENTAL SUPPORT
This invention was made with government support under DE-AR0000579 awarded by the United States Department of Energy. The government has certain rights in the invention. --

Signed and Sealed this
Sixteenth Day of November, 2021

Drew Hirshfeld
*Performing the Functions and Duties of the*
*Under Secretary of Commerce for Intellectual Property and*
*Director of the United States Patent and Trademark Office*